United States Patent [19]

Lucero et al.

[11] 4,283,709
[45] Aug. 11, 1981

[54] CASH ACCOUNTING AND SURVEILLANCE SYSTEM FOR GAMES

[75] Inventors: Andres R. Lucero, Reno, Nev.; David E. Williams, San Francisco, Calif.; James L. Nelson, Reno, Nev.

[73] Assignee: Summit Systems, Inc. (Interscience Systems), Sparks, Nev.

[21] Appl. No.: 116,669

[22] Filed: Jan. 29, 1980

[51] Int. Cl.³ ............................................. H04G 9/00
[52] U.S. Cl. ................................. 340/147 R; 235/375
[58] Field of Search ................ 364/200, 412; 235/375; 340/147 R

[56] References Cited

U.S. PATENT DOCUMENTS 4,108,361  8/1978  Krause ............................. 364/412 X Primary Examiner—Harold I. Pitts
Attorney, Agent, or Firm—Blakely, Sokoloff, Taylor & Zafman

[57] ABSTRACT

A cash accounting and surveillance system for games, whereby operation of a number of player operated gaming devices may be monitored for purposes of detecting abnormal operation and/or cheating and for providing automatic accounting information for record keeping and pilferage detection purposes. The system utilizes a node concept with each node having a non-volatile data storage capability and a communications capability for communicating with each of a plurality of gaming devices coupled to the node. The exemplary embodiment disclosed operates in conjunction with slot machines having mechanically rotatable reels and a microprocessor control system for randomizing the reel stopping payouts and other machine functions. Alternate embodiments are disclosed.

24 Claims, 18 Drawing Figures

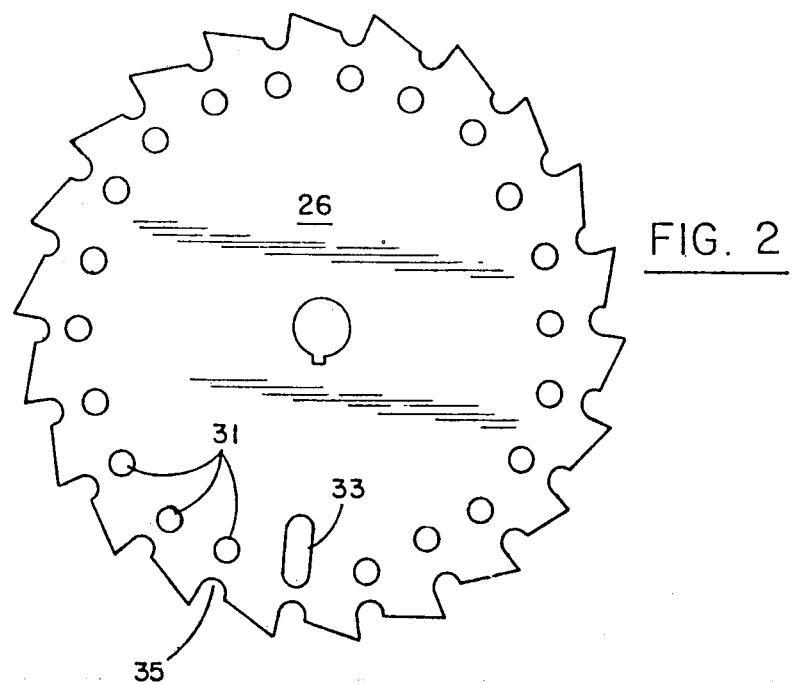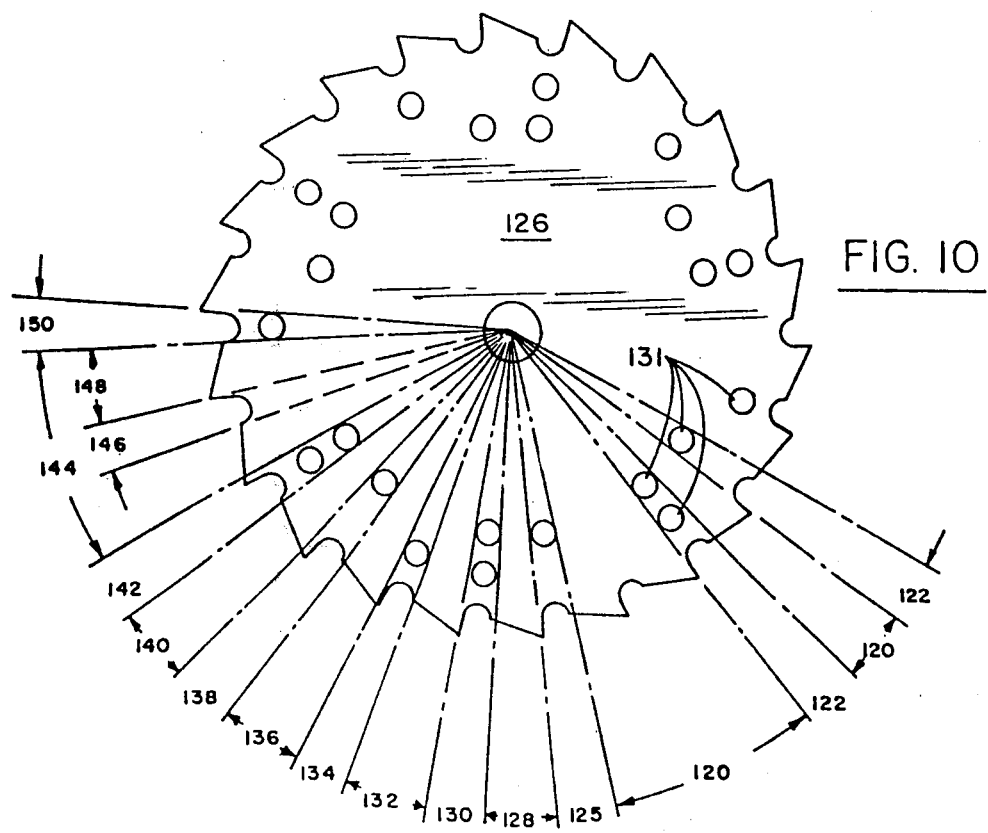

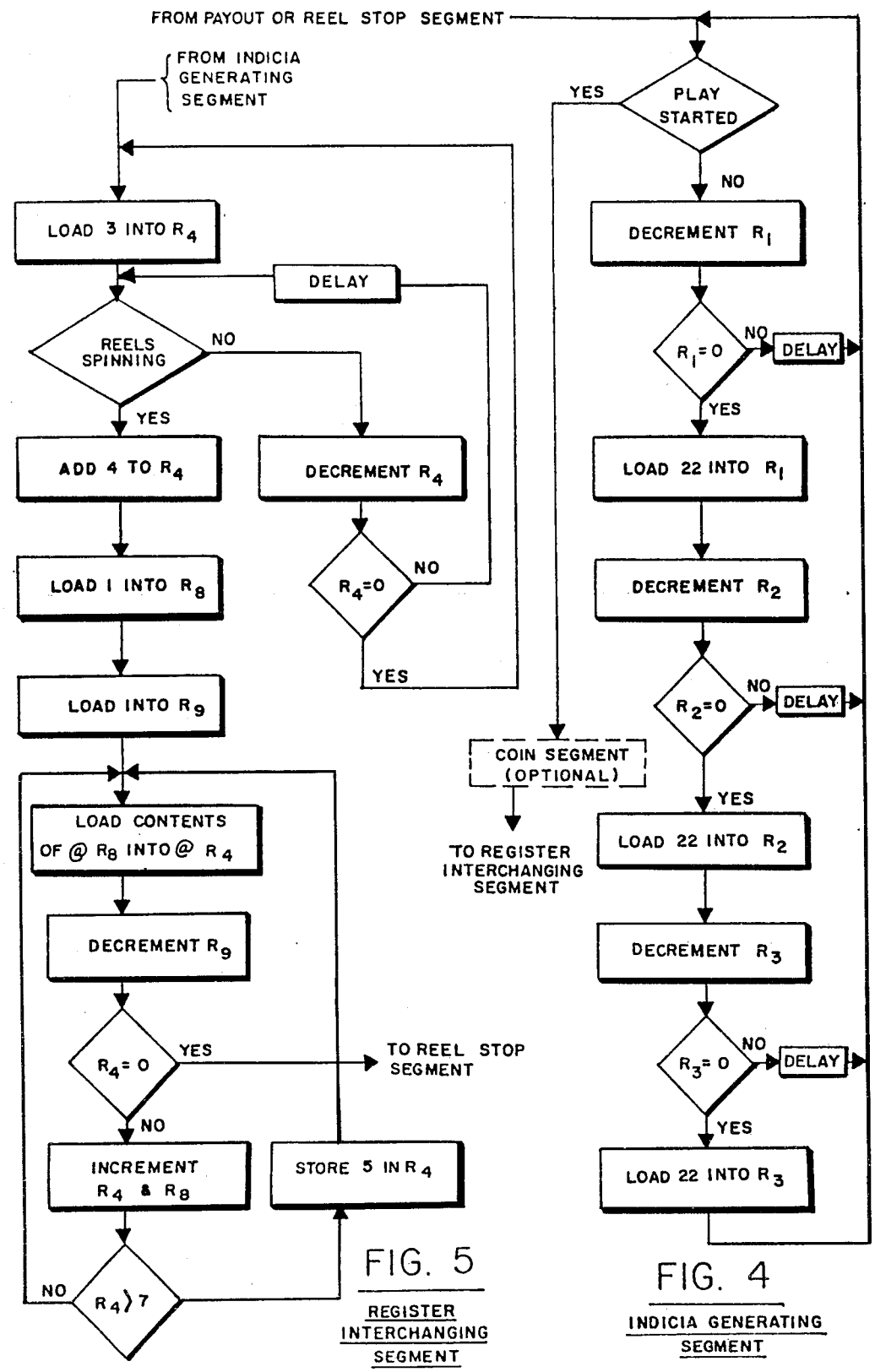

REFERENCE LOCATING SUBROUTINE

REEL STOP SEGMENT

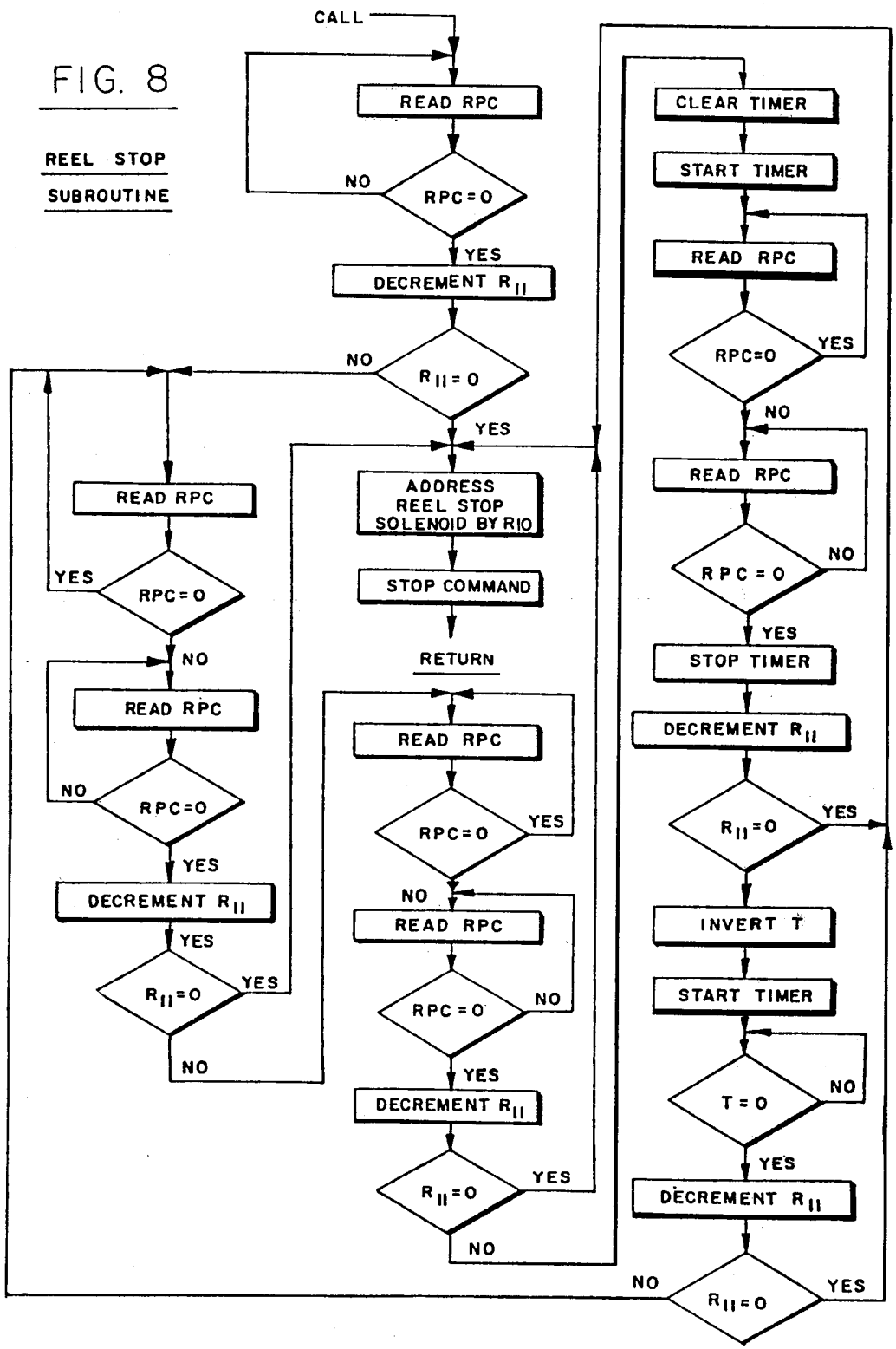

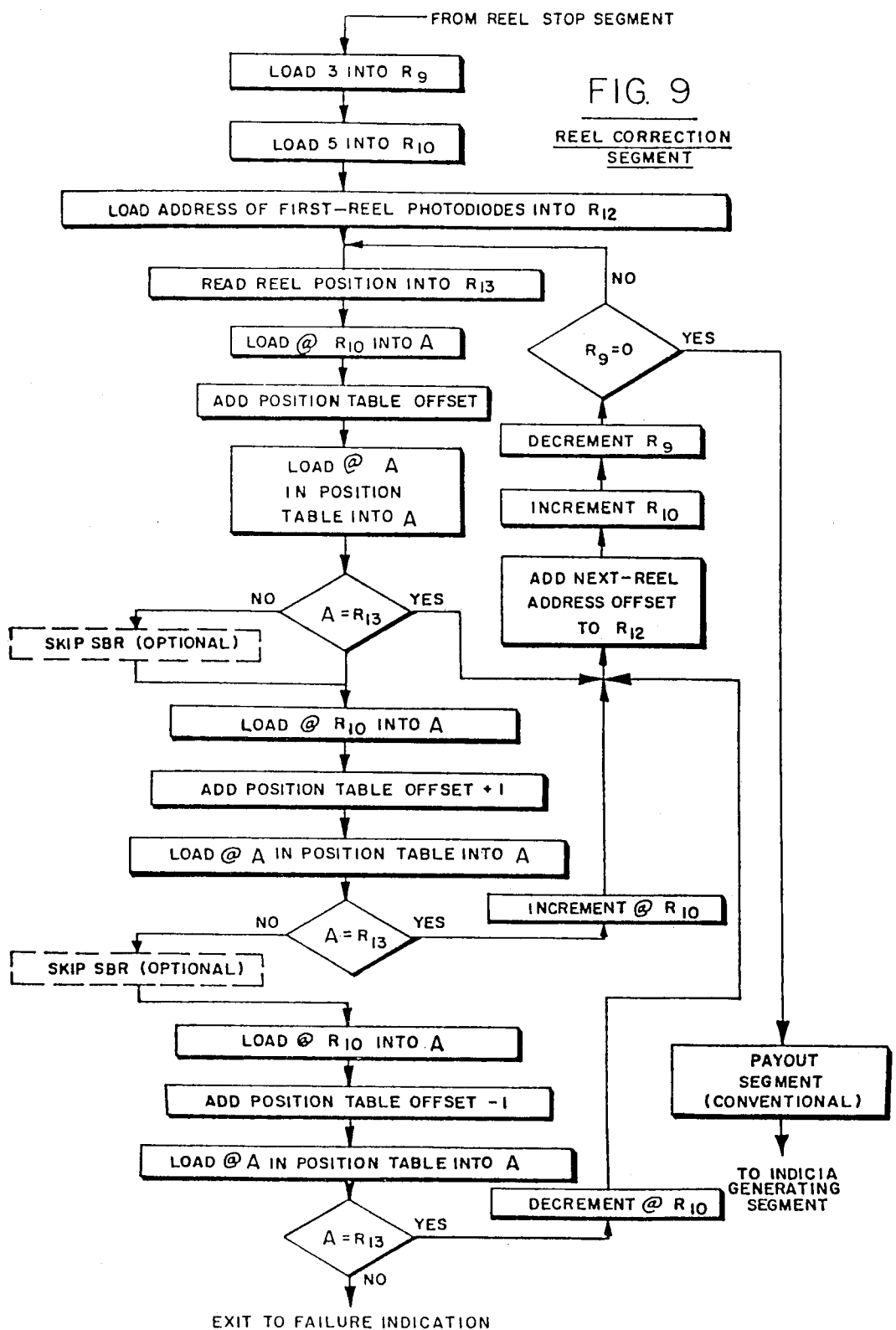

CASH ACCOUNTING AND SURVEILLANCE SYSTEM FOR GAMES

BACKGROUND OF THE INVENTION

1. Field of the Invention

The present invention relates to gaming devices and more particularly to player operated gaming devices, such as slot machines.

2. Prior Art

The exemplary embodiment of the present invention disclosed herein is intended for use in conjunction with slot machines and accordingly prior art described herein shall be described with respect to such machines, it being understood however, that the invention is not so limited.

Various types of slot machines have been well known for many years. Early slot machines were mechanical devices having some form of mechanically rotatable and randomly stoppable reels having certain indicia thereon, with an appropriate mechanical system for paying our predetermined numbers of coins based upon the appearance of various combinations of the indicia upon the random stopping of the reels. Later devices of this general type incorporated various forms of electro-mechanical devices for sensing reel position, controlling pay out upon the occurance of a winning condition and for controlling certain other aspects of machine operation. Still later designs included all electronic machines wherein the mechanically rotating reels were replaced with a cathode ray tube display displaying rotating reel images randomly stopped in accordance with the control electronics thereof. Of course, such devices are only exemplary of the various player operated gaming machines, characterized generally for the present purposes as machines wherein a player may deposit one or more coins or other items of monetary value for the privilege of playing the machine, after which play the machine may dispense money or other items of monetary value, or alternatively indicate a winning condition for manual payout. In either situation such a machine will ordinarily contain substantial amounts of money which is generally accessible to certain persons such as machine maintenance personnel prior to any counting or other accounting therefor. As a result, substantial though unknown pilferage is believed to occur with such machines. In addition, of course, mechanical malfunctioning of such machines or tampering of the machine itself may grossly effect the odds of winning whereby a player may empty a machine of coins before the problem is detected.

Various systems have been proposed to improve the accountability of such gaming devices. By way of example, U.S. Pat. No. 4,072,930 discloses a monitoring system for use with amusement game devices. That system is adapted for use with a computer and includes an interface unit connected to the computer and to a plurality of coupler units which are individually mounted on and interconnected with the gaming devices. Each of the coupler devices is adapted to receive a portable device for identifying individually each of the attending personnel. The identifying device or transponder locks into the coupler unit and provides informational responses to interrogation by the interface unit which sequentially polls and addresses each of the transponders. In the event a game device provides a winning condition, an operator inserts a transponder into the coupler unit of the game device that indicated the condition, which causes selective communication among the computer, coupler unit and transponder, including identification of the game device, transponder, size of the winning condition and other information. The size of the winning condition is thereafter displayed on a digital read-out, such as in the transponder, enabling the attending personnel to verify the condition. Once the amusement game device is then returned to playing condition, the transponder is unlocked and can be removed from the coupler unit and is available for insertion into other coupler units in response to winning conditions occurring therein. Such a system may be useful in monitoring and verifying the payouts of large jackpots to prevent theft or double payouts of floor personnel, though has limited use in other functions such as surveillance, in that communication with any particular gaming device only occurs on the establishment of the winning condition.

Another monitoring system for gaming devices such as slot machines is also known. That system constantly monitors and gathers complete functional and accounting data from each slot machine for recording at a central computer. In addition, the central computer includes means for controlling the slot machines in that any indication of tampering or malfunction will cause the system to shut down that machine. Because of the quantity of data being gathered by the central computer an extremely large storage capacity is required, all of which results in the gathering of more date than essential or convenient for the monitoring of the slot machines. Further, because the system can control the on-off function of the slot machines, various malfunctions and/or power losses can cause the system to turn off all slot machines requiring the manual resetting of each machine to the chagrin of the players because of the number of machines involved and limited personnel for accomplishing the task.

BRIEF SUMMARY OF THE INVENTION

A cash accounting and surveillance system for games, whereby operation of a number of player operated gaming devices may be monitored for purposes of detecting abnormal operation and/or cheating and for providing automatic accounting information for record keeping and pilferage detection purposes. The system utilizes a node concept with each node having a non-volatile data storage capability and a communications capability for communicating with each of a plurality of gaming devices coupled to the node. The exemplary embodiment disclosed operates in conjunction with slot machines having mechanically rotatable reels and a microprocessor control system for randomizing the reel stopping payouts and other machine functions. Alternate embodiments are disclosed.

BRIEF DESCRIPTION OF DRAWINGS

FIG. 2 is a side elevation of the reel disc used in the machine of FIG. 1.

FIG. 4 is a flow diagram of the indicia generating segment of the microprocessor program of FIG. 3.

FIG. 5 is a flow diagram of the register interchanging segment.

FIG. 8 is a flow diagram of the reel stop subroutine.

FIG. 9 is a flow diagram of the reel correction segment.

FIG. 10 is a side elevation of the reel disc used in the embodiment of FIGS. 3 through 9.

DETAILED DESCRIPTION OF THE INVENTION

The exemplary embodiment of the present invention system is intended for use in conjunction with slot machines having a mechanical reel spinning mechanism but otherwise microprocessor based so as to provide electronic control of the random reel stopping positions, pay-out control and machine monitoring. Because the present invention interfaces with each slot machine and in particular communicates with the microprocessor controlling the machine through a second microprocessor on a data communication board in the slot machine, it is believed appropriate to first describe the operation of the slot machine as an exemplary device forming a part of the system and with which the system operates. Thus, FIGS. 1-10 and the description thereof which follows describe the method and apparatus for randomly positioning indicia bearing members or reels on the slot machines, which apparatus may also include other machine functions such as payout machine monitoring and cheat detection.

Figure 1:
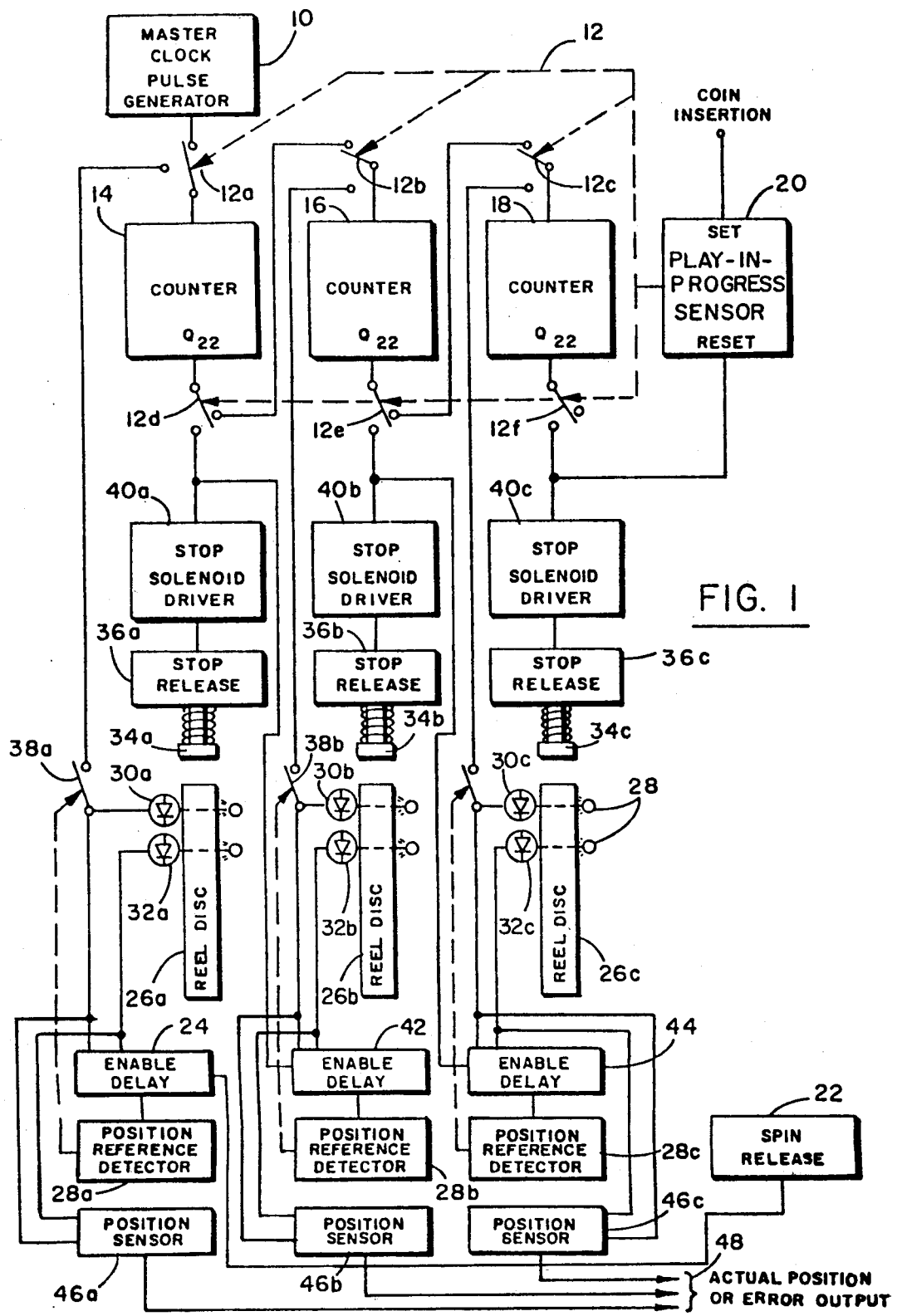
FIG. 1 is a block diagram of the circuit of a hardware embodiment of a gaming machine which may be used with the present invention.

FIG. 1 schematically shows the general functioning of the game machine. In the ideal condition of the machine, the master clock pulse generator or oscillator 10 produces clock pulses at a frequency which is not critical but which is preferably chosen to be at least ten times the frequency at which indicia pass the display line of the machine when the reels are spinning. In a typical embodiment of the machine, a master clock frequency of 100 kHz may be used.

In the idle condition of the machine, the switches 12a through 12f are in the position shown in FIG. 1. It will be understood that the switches 12a through 12f would in practice be switching transistors controlled by a control signal 12, but they have been shown as physical switches in FIG. 1 for clarity.

With the switches 12a through 12f in the position shown, the master clock pulses are fed into counter 14. This counter is of the recycling type and may, in a typical embodiment, have 22 steps. Consequently, on a count of 22, counter 14 will produce an output pulse at $Q_{22}$ and return the count to zero. The output pulses at $Q_{22}$ of counter 14 becomes the input pulses for counter 16, which functions in a like manner. The output pulses at $Q_{22}$ of counter 16 in turn become the input pulses for counter 18.

Each of the counters 14, 16, 18 is associated with one of the reels of the game machine, and the number of steps in each counter is equal to the number of indicia on the reel which it is associated.

In a three-reel machine such as shown in FIG. 1, it will take 22×22×22 or 10,648 master clock pulses to cycle all three counters at least once. At a clock frequency of 100 kHz, this takes approximately one-tenth of a second. Consequently, in the several seconds which will elapse between plays in even the fastest use of the machine, all the counters will cycle through their count many times.

The initiation of a play by a player sets a play-in-progress sensor 20. The sensor 20 may typically be a flip-flop circuit which can be set in various ways, depending on the type of machine involved. For example, in a coin-operated machine, the sensor 20 may be actuated by the acceptance of a coin. In a non-coin operated machine, the play-in-progress sensor 20 might be set by a microswitch actuated when the player moves the handle of the machine out of its rest position and begins to cock the reel-spinning mechanism.

Upon actuation of the play-in-progress sensor 20, switches 12a through 12f are moved to their other position, and the counters 14, 16, 18 are disconnected from the master pulse generator 10. The counters thus stop in a totally random position depending on the exact number of master clock pulses which have been counted (at the rate of 100,000 per second) since the end of the previous play.

Movement by the player of the handle of the machine toward the fully cocked position eventually trips a spin-release mechanism 22 of conventional design within the machine, and the reels begin to spin. The tripping of the spin-release mechanism 22 may be sensed by a microswitch or other appropriate device (not shown) and is used to start the enable delay circuit 24, whose operation will be described below.

The reels are mechanically tied to a reel disc 26 shown in detail in FIG. 2. The reel disc 26 has a pattern of openings through which light beams from light sources 28 can reach photodiodes 30, 32 as the reel disc spins together with the reel to which it is attached. The rim of the reel disc 26 is equipped with notches designed to be engaged by stop dog 34 as released by the stop release 36.

It will be seen in FIG. 1 that a separate reel disc 26a, 26b and 26c is provided for each of the reels of the machine. As the reels spin, the openings in the reel discs 26 cause pulses to be generated by photodiodes 30, 32. The photodiodes 30 are positioned adjacent the row of openings 31 in reel disc 26 in such a manner that they will prodice one pulse for each indicia position that passes a photodiode 30. The photodiodes 32 are so positioned that they will produce a pulse only in each revolution of the disc 26 when the slot 33 passes by them.

After the reels have spun a predetermined length of time, the enable delay circuit 24 times out and connects photodiodes 30a and 32a to position reference detector 28a. The position reference detectors 28 detect the reference pulse from photodiodes 32 as they pass a slot 33, and use this pulse to close switch 38.

With switch 38a closed, the pulses produced by photodiode 30a are conveyed through switch 12a to counter 14. These pulses advance the counter from the count on which it has stopped until it reaches the count which produced an output at $Q_{22}$. The output pulse from $Q_{22}$ of counter 14 is conveyed through switch 12d to the stop solenoid driver circuit 40a which actuates stop release 36a and causes stop dog 34a to engage a notch 35 on reel disc 26a to stop the first reel.

At the same time, the output pulse from $Q_{22}$ of counter 14 starts enable delay 42 to provide an appropriate time interval before the stop sequence for the second reel is initiated. The stop sequence for the second reel is identical to the one described above, with the position reference detector 28b closing switch 38b whereupon the pulses from photodiode 30b advance the counter 16 until stop solenoid driver 40b actuates the stop release 36b.

The output pulse at $Q_{22}$ of counter 16 starts enable delay 44, and the process is repeated to stop the third reel associated with reel disc 26c.

If it is necessary to produce an electronic output indicative of the position in which the reels have stopped, this cannot reliably be done by counting the pulses of photodiode 30 from the reference point 33, as it is possible that the stop dog 34 may not properly engage the reel disc 26 and may cause the mechanism to jump to a position adjacent to the one that was intended. For this reason, position sensors 46 are provided to compare the output of their associated counter 14, 16, or 18 with the count of their associated photodiode 30 from the reference point. If they fail to match, the true count and/or an error indication may be conveyed to an output 48. The output pulse from $Q_{22}$ of the last counter 18 may be used to reset the play-in-progress sensor 20 so as to restart the random count of master clock pulses from master clock pulse generator 10 for the next play, and to enable the coin acceptor mechanism in a coin-operated machine.

Figure 3:
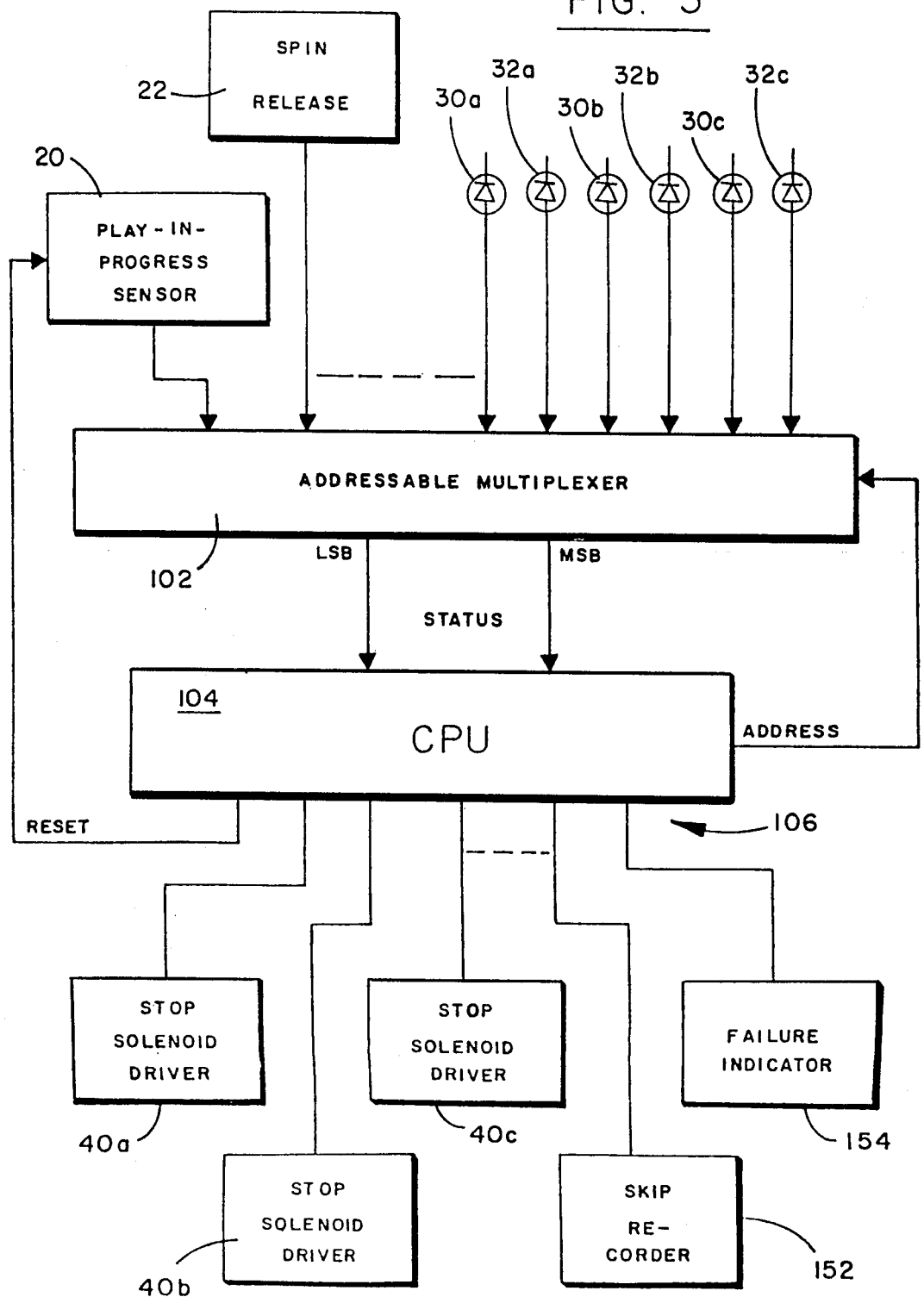
FIG. 3 is a block diagram of a microprocessor embodiment of the gaming machine.

As shown in FIGS. 3 and 10, this method can be carried out not only by the above-described circuitry, but also by an appropriately programmed microprocessor.

In FIG. 3, a conventional microprocessor 100 is shown as consisting basically of an addressable input multiplexer 102, a central processor unit 104, and outputs 106. The inputs to multiplexer 102 are binary inputs from the machine's play-in-progress sensor 20, reel release 22, and photodiodes 30a through 30c and 32a through through 32c (FIG. 1). The outputs 106 include outputs to the stop solenoids 40a through 40c (FIG. 1), as well as to the reset input of the play-in-progress sensor 20. Other inputs and outputs may of course be used in connection with other game functions, such as various forms of cheat detection and malfunction sensing as desired or appropriate.

The sequence of microprocessor operations of the machine is illustrated in the flow charts of FIGS. 4 through 9. Referring first to FIG. 4, the indicia segment of the program is initiated by the end of the previous play and the consequent resetting of the play-in-progress sensor 20. The program starts by addressing the play-in-progress sensor 20 (in a coin operated machine, this would be the coin acceptor) through the multiplexer 102 and testing its status to determine if a new play has been initiated (e.g. by the acceptance of a coin).

If no new play has yet commenced, the program decrements a storage register $R_1$ in the microprocessor's memory. $R_1$ is then tested for zero. If $R_1$ is nonzero, the cycle is repeated after a short loop delay (preferably obtained by the insertion of an appropriate number of no-operation instructions) which assures that the cycle time from negative branch of the "play started" test back to its input is constant regardless of the path followed.

If $R_1$ is zero, the program loads into $R_1$ the number of indicia per reel (22 in a typical slot machine), decrements a second memory register $R_2$, and tests the latter for zero. The same procedure is used with respect to a third memory register $R_3$ (for a three-reel machine). Additional registers would be used if the machine has more than three reels.

It will be seen that as long as the machine is idle, (i.e. no new play has been initiated), registers $R_1$ through $R_3$ act as a cascade counter. Consequently, each of $R_1$, $R_2$ and $R_3$ contains, at any given monent, a number between 1 and 22. If the microprocessor is, for example, an Intel 8048, it would have a cycle time of 4.19 microseconds per instruction; consequently, registers $R_1$ through $R_3$ would take approximately 625 milliseconds to run through all 10,648 possible number combinations. As described hereinabove in connection with the hardware embodiment of the machine, this may not be quite fast enough for sufficient randomness; however, the randomness of the program is substantially increased by randomly interchanging the register counts and by starting the count from a random count, both as hereinafter described.

When play is begun (as, for example, by the acceptance of a coin in a coin-operated machine or the pulling of the handle in a non coin operated machine), the test of the play-in-progress sensor input causes the program to freeze the count in registers $R_1$ through $R_3$ and to divert program execution to the next program segment, which may be a conventional segment commonly used in all electronic machines and designed to control the coin-mechanism and release the handle. It could be omitted in a non-coin-operated machine, in which the program would proceed directly to the register interchanging segment.

Referring now to FIG. 5, the register interchanging segment of the program is entered directly upon completion of the coin segment (in a coin-operated machine) or indicia generation segment (in a non-coin operated machine). It begins by loading a number equal to the number of reels in the machine (3 in the described embodiment) into a memory register $R_4$. The input from spin release is tested again, after a short delay designed to equalize the zero and nonzero loop cycle time. If $R_4$ is zero, the number of reels is again loaded into $R_4$, and the cycle resumes. Thus, in the described embodiment, $R_4$ at any given time contains a number between 1 and 3, cycling through all three combinations approximately every 16 microseconds.

As soon as the handle of the machine has been pulled far enough to wind the reel drive spring and trigger the spin release, the spin release input changes status. The next "reels spinning" test determines that the reels are now spinning and freezes the count in $R_4$.

In order to increase the randomness of the indicia count, the contents of $R_1$ through $R_3$ are to be loaded into memory registers $R_5$ through $R_7$ in a sequence determined by the contents of $R_4$. For this purpose, the number 4 is added to the contents of $R_4$ so that $R_4$ will now contain the address of $R_5$ if it previously contained a 1; the address of $R_6$ if it previously contained a 2; and the address of $R_7$ if previously contained a 3. The number 1 (the address of $R_1$) is now loaded into a memory register $R_8$, and the number 3 (the number of reels) is loaded into a memory register $R_9$.

The contents of the register whose address is in $R_8$ (i.e. the contents of $R_1$) are now loaded into the register whose address is in $R_4$ (i.e. $R_5$, $R_6$, or $R_7$), and register $R_9$ is decremented and tested for zero. If it is non zero, $R_4$ and $R_8$ are both incremented, and $R_4$ is tested to see if it now contains a number greater than 7 (the address of $R_7$). If it does, the number 5 (i.e. the address of $R_5$) is loaded into $R_4$.

The sequence now returns to the loading of the contents of the register address by $R_8$ (now $R_2$) into the register addressed by $R_4$ (now the next one in line of registers $R_5$, $R_6$, and $R_7$). In like manner, the contents of $R_3$ are loaded into the remaining one of registers $R_5$, $R_6$ and $R_7$. It will be noted that registers $R_1$, $R_2$, and $R_3$ are not modified by this sequence so that the indicia generation count will resume at the end of the play, at whatever count was in $R_1$, $R_2$ and $R_3$ at the beginning of the play. This makes the indicia generation count more random than in the hardware embodiment of FIGS. 1 and 2 in which the count always starts from zero.

Figure 6:
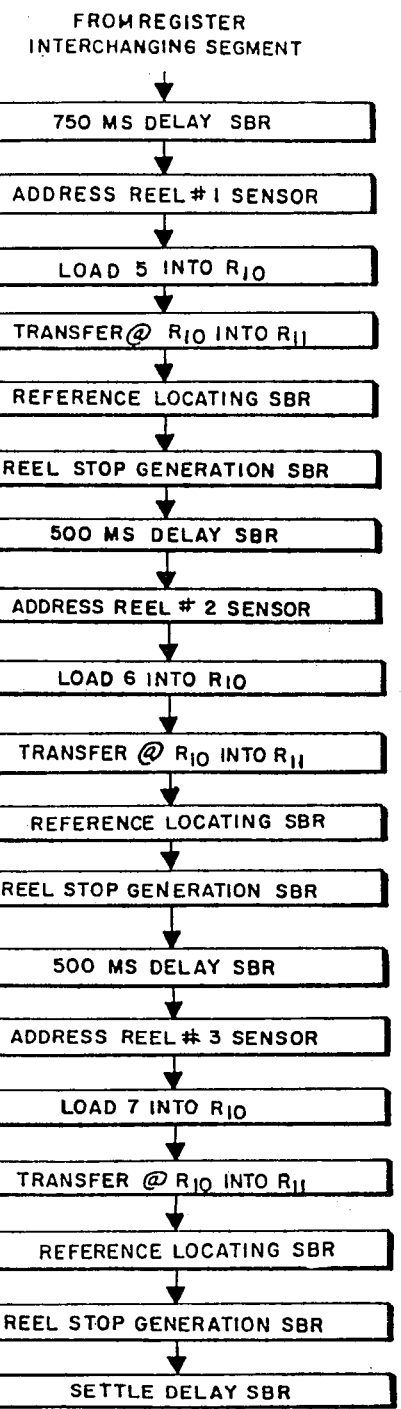
FIG. 6 is a flow diagram of the reel stopping segment.

When $R_3$ has been loaded into the remaining one of registers $R_5$, $R_6$ and $R_7$, the next decrement of $R_9$ zeros it, and the subsequent test of $R_9$ for zero transfers the program to the reel stop segment of FIG. 6.

The reel stop segment begins with an arbitrary delay, shown in FIG. 6 as 750 ms, which represents the length of time for which the first reel is allowed to spin. This time delay can be achieved conventionally by loading a register with a predetermined number and cyclically decrementing it until it reaches zero, the predetermined number being so chosen that the countdown to zero will require the desired length of time.

Upon expiration of the delay, the program addresses the input multiplexer 102 (FIG. 3) in such a way that the input to the central processor unit 104 consists of a two-digit binary number whose least significant bit (LSB) is determined by photodiode 30a (FIG. 1) and whose most significant bit (MSD) is determined by photodiode 32a respectively, associated with the reel disc 126a of the first reel.

The number 5 (i.e. the address of $R_5$) is now loaded into a memory register $R_{10}$. The contents of the register addressed by $R_{10}$ (in this instance, $R_5$) are then loaded into another memory register $R_1$. The reference-locating subroutine hereinafter described (FIG. 7) is now called to locate the reference position 125 on the reel disc 126a (see FIG. 10), whereupon the reel stop generation subroutine, also hereinafter described (FIG. 8) is called to stop the first reel at a position determined by the contents of $R_1$.

After stopping the first reel, an arbitrary delay (500 ms in the described embodiment) is interposed to allow observation of the first reel by the player before the second reel stops. The input multiplexer 102 is then addressed to read photodiodes 30b and 32b, the address of $R_6$ is loaded into $R_{10}$, and the program proceeds to stop the second reel in the same manner as described above, based on the contents of $R_6$ which is now in $R_{11}$.

Following the stopping of the third reel in accordance with the signals from photodiodes 30c and 32c, and the contents of $R_7$ as duplicated in $R_{11}$, a short delay subroutine is called to allow the third reel time to settle. When the reels have settled, the program moves on to the reel correction segment of FIG. 9.

Backtracking now to the reference-locating subroutine of FIG. 7 mentioned above, it works as follows: When called, the subroutine first reads the reel position code (RPC) as determined by the LSB and MSB status inputs from the photodiodes 30, 32, respectively, currently being addressed by the multiplexer 102. By testing this code for zero, the program first locates a sector 120 of reel disc 126 which has no holes. It then reverses the test to find the next sector 122 of disc 126 in which there is at least one hole 131. When the start of a sector 122 is located, a 4 ms delay is interposed to make sure that no misread can result from a slight misalignment of the two holes in a two-hole sector.

The RPC is now read again and tested for equality to binary 3 (holes in both the inner and outer rows, FIG. 10). If the test is negative, the section under examination cannot be section 124, and the search for the next section 122 resumes. If the test is positive, the program again looks first for the next section 120, then for the next section with holes 131. When the latter section is located, the RPC is again read and a test for RPC=2 is performed. If that test is negative, the section under examination cannot be section 125, and the original search resumes. If the test is positive, however, the section under examination must be the reference section 125, as this is the only section on disc 126 in which an RPC of 2 follows an RPC of 3 without an intervening RPC of 1.

Having thus located the reference section 125, the program now looks for section 128, then section 130. As soon as the disc 126 reaches section 130, the reference-locating subroutine returns control to the main program in the reel stop segment of FIG. 6.

Figure 7:
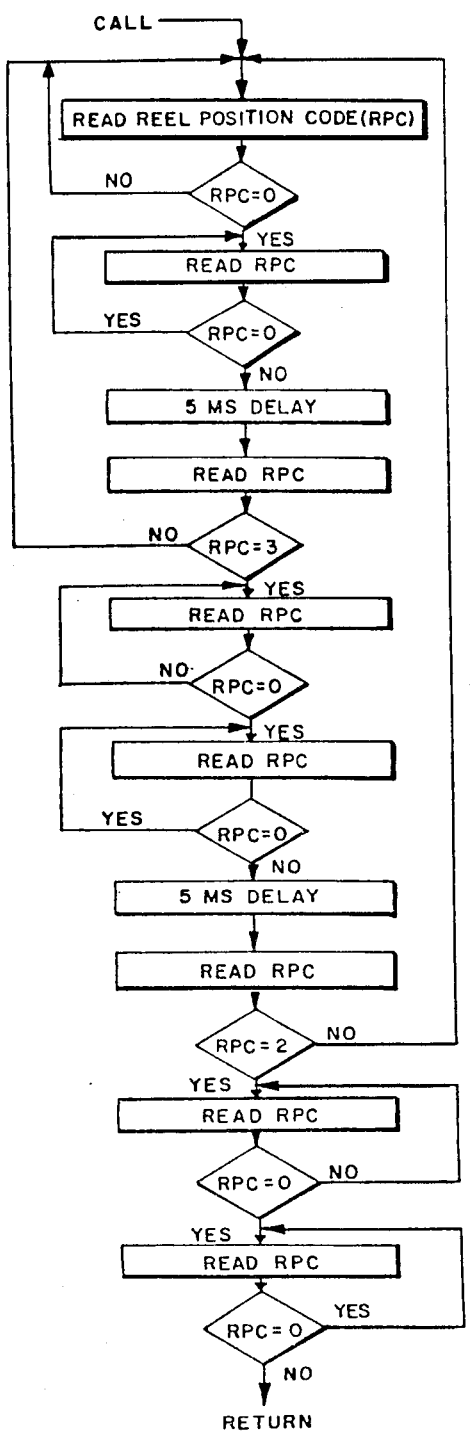
FIG. 7 is a flow diagram of the reference-locating sub-routine.

Immediately upon the return from the reference-locating subroutine of FIG. 7, the program calls the reel stop subroutine of FIG. 8. This subroutine begins as the disc 126 enters sector 130, and looks first for sector 132. When a positive RPC=0 test indicates that sector 132 has been reached, the memory register $R_{11}$ (which, it will be recalled, contains a number between 1 and 22) is decremented and tested for zero. If $R_{11}$ is now zero, the contents of $R_{10}$ (which are related to the number of the reel being stopped) are used in an appropriate algorithm to generate the address of the output 106 to which the solenoid driver 40a, 40b or 40c (FIG. 1) of the reel being stopped is connected. Having generated the proper output address, the program actuates the appropriate trip release 36a, 36b, or 36c through the selected output and driver and stops the reel in sector 134 by engagement of the stop dog 34 with the notch 135 on reel disc 125 (FIG. 10).

If $R_{11}$ is nonzero when tested, the subroutine first searches for sector 134, then sector 136. At the beginning of sector 136, $R_{11}$ is again decremented and tested for zero. If $R_{11}$ tests out zero, the stop release is actuated as described above to stop the reel in sector 138. In like manner, a negative zero-test of $R_{11}$ initiates a search for sectors 138 and 140, where another zero-test of $R_{11}$ triggers the stop sequence, if positive, to stop the reel in sector 142.

It will be noted that the reel stop subroutine does not use the 5 ms delay following a hole detection as the reference-locating subroutine does. The reason for this is that the reel stop subroutine needs to detect only the presence of a nonzero RPC, whereas the reference-locating subroutine also needs to detect the value of the nonzero RPC.

If $R_{11}$ in the last mentioned test is still nonzero, the program clears and then starts the microprocessor's internal timer which, in essence, counts the microprocessor's clock pulses. While the timer is running, the subroutine looks for sector 142, then sector 144. When the beginning of sector 144 is detected, the timer is stopped. The timer register T now contains a number representative of the time it took the reel to move from the beginning of sector 140 to the beginning of sector 144. This is important because the next indicia position sector 146 on the reel disc 126 is part of sector 144 and has an RPC of zero; consequently, the photodiodes 30, 32 are the beginning of sector 146 by a timing operation. Inasmuch as the reels of the machine can (and usually purposely do) spin at different speeds, it is necessary to establish, by the above-described timer count, how long it takes the reel to move from one indicia position sector to the next.

Following the stopping of the timer, $R_{11}$ is again decremented and tested for zero. If it is zero, the stop sequence is initiated, and the reel stops in sector 146. If it is not, the contents of timer register T are inverted and the timer is started, which has the effect of counting time backwards. The timer register T is continually tested for zero, and when the test is positive, the reel will have reached the beginning of sector 148. At that time, $R_{11}$ is again decremented and tested for zero. If it is zero, a reel stop in sector 150 is initiated: if not, the entire above-described sequence is resumed, beginning with the RPC detection following the first test of $R_{11}$ in the reel stop subroutine.

Inasmuch as the mechanical reel stops are subject to wear and bouncing, the reel may, on rare occasions, stop one indicia position short or one indicia position too far. In a coin-operated machine with an automatic payout mechanism, this would result in a false payout evaluation. It is therefore necessary, in the program for such a machine, to provide the reel correction segment illustrated in FIG. 9.

In that segment, the number 3 (i.e. the number of reels in the machine) is first again loaded into $R_9$. The number 5 (i.e. the address of $R_5$) is then loaded into $R_{10}$, and the multiplexer address of first reel photodiodes 30a, 32a is loaded into a memory register $R_{12}$. The multiplexer 102 is then addressed from $R_{12}$, and the RPC of the first reel is read into a memory register $R_{13}$. The contents of the register addressed by $R_{10}$ (i.e. $R_5$) are next loaded into the expected indicia position of the first reel.

A predetermined position table offset constant is now added to register A to create the address of a position table register in an appropriately preprogramed block of memory. The position table register so addressed contains the RPC which should be seen by the photodiodes 30a, 32a if the first reel has indeed stopped where it was supposed to.

The expected RPC from the position table register addressed by the accumulator is now loaded into the accumulator and tested for equality to the actual RPC stored in register $R_{13}$. If they are equal, the reel has stopped where it should and no correction is necessary. In that event, an appropriate offset is added to the first-reel photodiode address in $R_{12}$ to create the multiplexer address of the second-reel photodiodes 30b, 32b.

Register $R_{10}$ is then incremented to contain the address of $R_6$, and $R_9$ is decremented and tested for zero. If $R_9$ is nonzero, the actual RPC of the second reel is now read into $R_{13}$, and the companion cycle is repeated for the second, and eventually, the third reel.

If the equality test of A and $R_{13}$ is negative, a skip has occurred. If it is desired to monitor the occurrence of such malfunctions a skip subroutine (not described in detail) may be optionally be used at this point to actuate an appropriate recording device 152 through one of the outputs 106 (FIG. 3).

To determine the direction of the skip, the contents of the register addressed by $R_{10}$ (i.e. $R_5$ for the first reel) are once again loaded into the accumulator register A. This time, however, the predetermined position table offset value plus 1 is added to register A. The subsequent transfer of the position table register contents to A places into A the RPC of the next indicia position beyond the expected one.

When A is now tested for equality to $R_{13}$, a positive test means that the reel has gone one position too far; consequently, the register addressed by $R_{10}$ is incremented to make the expectation conform to reality, and the next reel is checked.

If A and $R_{13}$ are still unequal, the skip must have been rearward, and the above-described procedure is repeated with the predetermined position table offset minus 1. If a renewed test of A and $R_{13}$ for equality is positive, the register addressed by $R_{10}$ is decremented to conform to reality, and the next reel is checked.

If the last-mentioned equality test is still negative, the program diverts to a failure mode routine (not shown) which halts program execution and, through an appropriate output 106, indicates the need for maintenance by actuating a failure indicator 154 (FIG. 3).

After all the reels have been checked, and any necessary corrections made, the $R_9=0$ test will be positive, and the program exits to a conventional payout segment (not shown). The payout segment is of the type commonly used in all-electronic machines. In essence, it compares the contents of $R_5$, $R_6$ and $R_7$ (which, it will be noted, are now corrected to conform to the actual position of the reels) with a preprogrammed payout table and operates the coin payout mechanism accordingly if the reels have stopped on a winning combination of indicia.

At the end of the payout segment (which includes the conventional housekeeping checks of the machine's mechanisms to ascertain that it is ready for the next play) the play-in-progress sensor is reset through an output 106 (in a coin machine, the coin acceptor is enabled), and the program returns to the indicia-generating segment of FIG. 1, through which it cycles until the next play begins.

Figure 11:
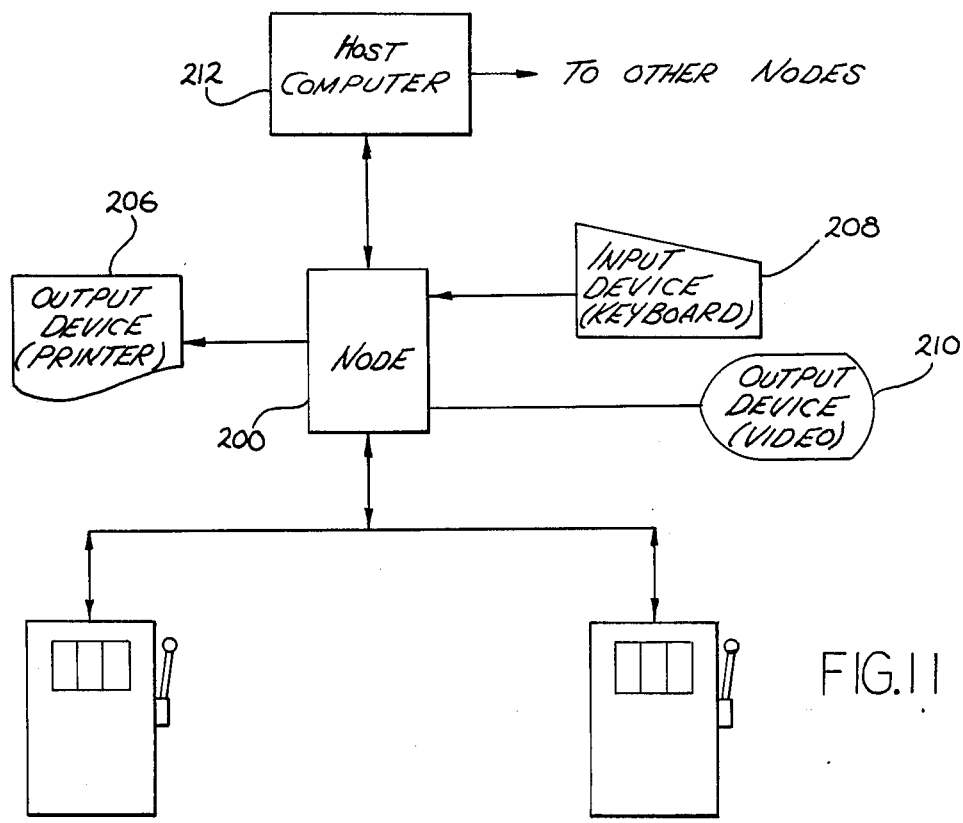
FIG. 11 is a block diagram of the system of the present invention.
Figure 12:
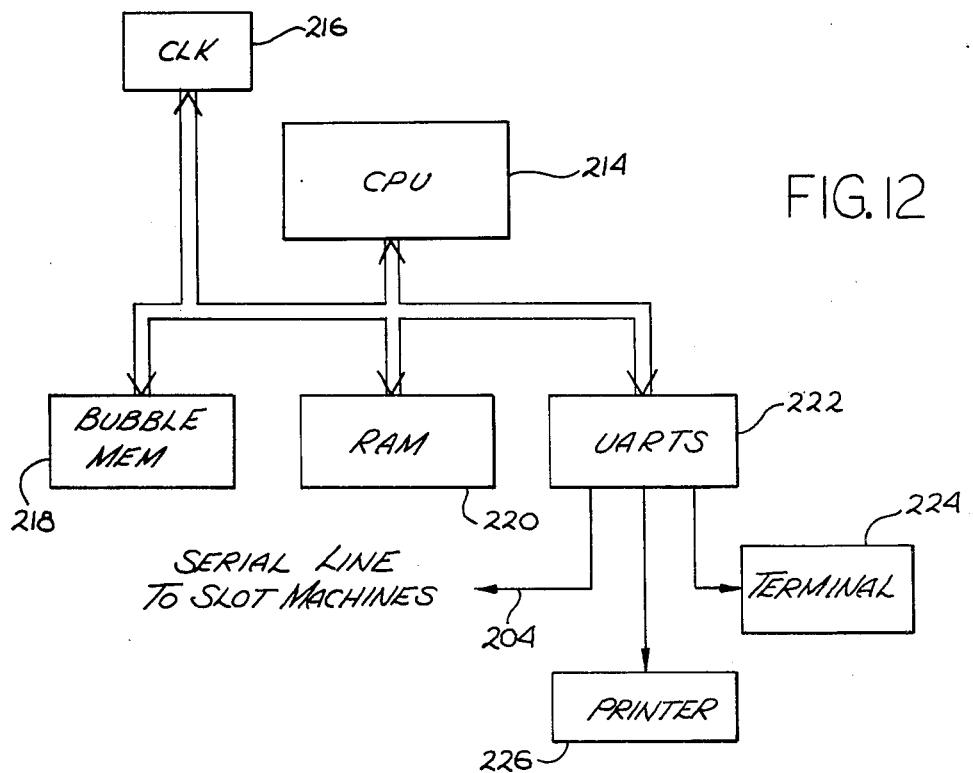
FIG. 12 is a block diagram of a typical node of the present invention.

Now referring to FIG. 11, a block diagram of an overall system in accordance with the present invention may be seen. The system is organized on the node concept, with each node 200 being coupled to up to 256 slot machines 202 through a single serial input/output line 204. In the preferred embodiment this serial I/O line is a standard RS-232 line. In addition to this line the node is coupled to a printer 206, an input device such as a keyboard 208, a CRT display 210, and finally to a host or central computer 212, typically the central accounting computer for the casino. As an alternative, each node may have some substantial bulk storage capacity such as disc storage for subsequent reading and/or processing by the central computer 212 as opposed to being directly coupled thereto. The specific block diagram for each node of the preferred embodiment may be seen in FIG. 12. The CPU 214 in this embodiment is comprised of Intel Corporation microcomputer boards based upon that company's 8080 microprocessor, more specifically, the SBC 655, the SBC 80/20, and the SBC 534 boards. The real time clock 216 is a TCU 410 real time clock with the CPU 214 communicating through a bus structure to a bubble memory 218, a random access memory 220 and UARTs 222 for communication to a Hazeltine 1500 terminal 224, a standard printer 226 and the serial I/O line 204. The bubble memory 218 is an 92 K byte bubble memory board, manufactured by Bubbletek, to provide adequate non-volatile storage at the node to maintain normal data during any power outages.

Figure 13:
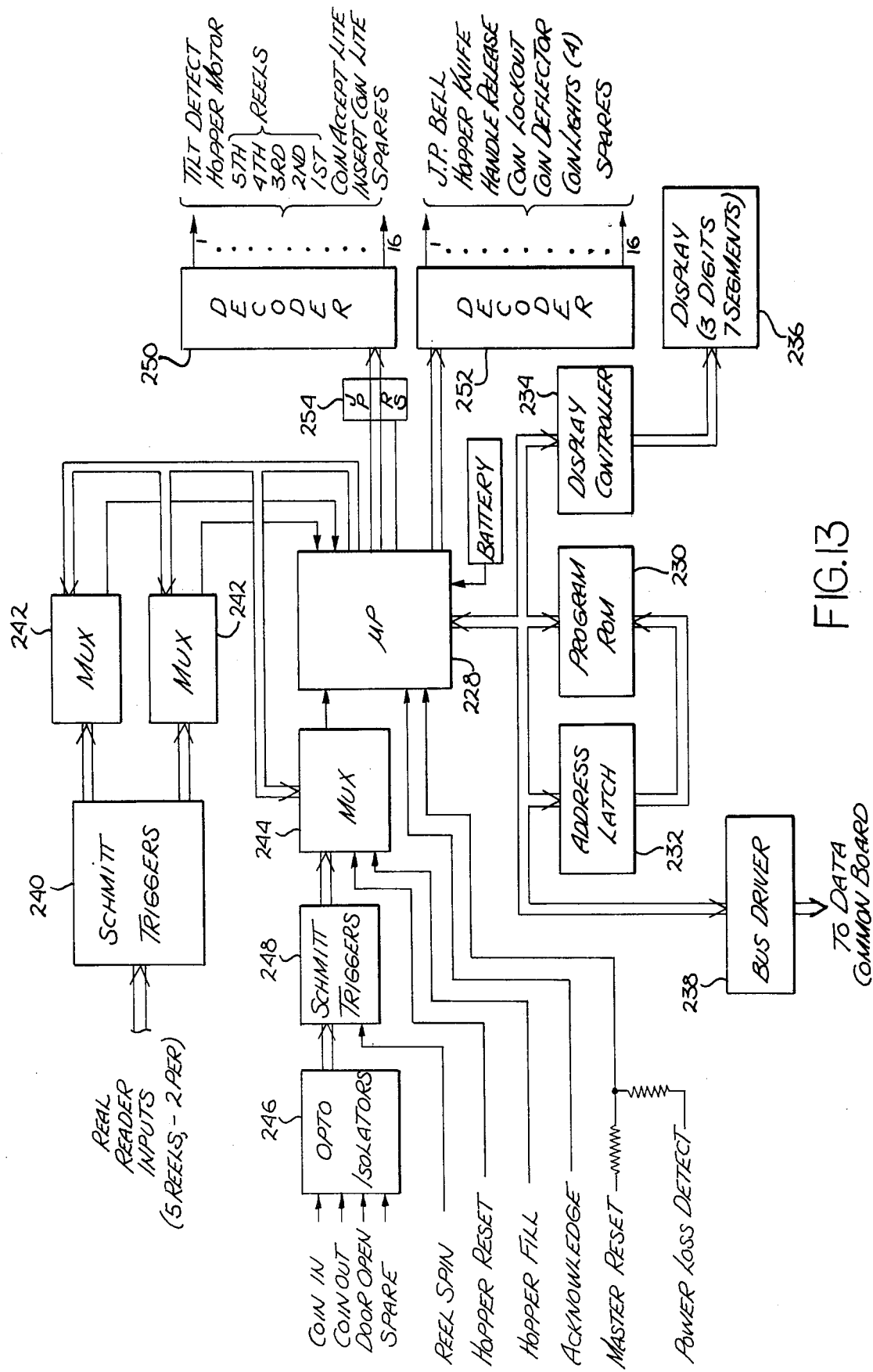
FIG. 13 is a block diagram of the gaming machine controller board.

Now referring to FIG. 13, a block diagram of the gaming machine controller board may be seen. This embodiment is the microprocessor based embodiment hereinbefore described. The microprocessor 228 in the preferred embodiment is an Intel 8035 single chip computer having on chip random access memory and read only memory storage. In addition, however, additional external read only memory 230 is used, with address latch 232, being on the same bus as read only memory 230, allowing the communication of both addresses to the ROM and instructions from the ROM over a single bus, specifically the data bus for the 8035. Also coupled to this same bus is a self cycling display controller 234 driving three seven-segment display digits 236, readable from within the slot machine for service and maintenance aid. The data bus is also coupled through a bi-directional tri-state bus driver 236 to the data com board yet to be described with reference to FIG. 14.

The microprocessor 228 receives a plurality of inputs from various sensors in the slot machine for control and/or communication purposes. In the description of FIG. 1 it will be noted that each reel disc has associated therewith two photodetectors. The controller of FIG. 13 is capable of controlling five reel machines and accordingly, ten reel reader inputs corresponding to two inputs each for five reels may be provided to Schmitt triggers 240, the outputs of which are multiplexed multiplexers 242 controlled through control lines coupled to the second port of the microprocessor, with the output of the multiplexers being provided to the first port of the microprocessor. The second port is also coupled to multiplexer 244 for control purposes, which multiplexer multiplexes a plurality of signals for presentation to the microprocessor on the TO line of the 8035. In particular, switch signals indicating coin in, coin out and service door open are coupled to the multiplexer 244 through conventional optoisolators 246 and Schmitt triggers 248. Also coupled to the schmidt trigger is a signal indicating that the reels are spinning, which of course is also multiplexed by the multiplexer. Hopper reset and hopper fill signals are provided directly to the multiplexer 244, while an acknowledge signal is provided directly to the T1 pin of the microprocessor (the T0 and T1 pins of the 8035 are input pins, testable under program control for conditional jumps). As shall subsequently be seen the acknowledge line is coupled to the data comm board of FIG. 14 to provide a jump for servicing the data comm board upon a request therefrom. Finally, the microprocessor also receives a reset signal corresponding to a master reset, the reset signal to the microprocessor also being responsive to a power loss detection to reset both on a master reset command and upon a power loss. Aside from the appropriate controls of the multiplexers, memory etc. the microprocessor puts out a plurality of control signals to decoders 250 and 252. The input to decoder 250 comprises four lines of the first port of the microprocessor, which on decoding provide control signals for the tilt light, the hopper motor (for coin dispensing upon a winning condition), for the stop solenoid drivers (see FIG. 1), for up to five reels for the coin accept light and for the insert coin light. In addition, a fifth line from port 1 is used as a denomination detecting line, with jumpers between this line and any one of the other four lines determining the denomination of the machine (i.e. a dime, quarter, half-dollar or dollar machine). In that regard, it should be noted that the ports on the 8035 are referred to by the manufacturer as quasi-bi-directional, which allows use of part of the port as output and any other part of the port as input. For a description of the port characteristics see, for instance, Paragraph 2.1.4 input/output on page 2-4 of Intel Corporation's user's manual on the MCS-48 (a trademark of Intel) family of single chip microcomputers (1978). Thus, the program for the microprocessor will test the state of the jumpers 254 to determine the monetary value of the coins being used so that a single controller board may be used on machines of any denomination by simple changes in the jumpers. Finally, a portion of the output of the second port is used as an input to decoder 252, with the output thereof controlling the jackpot bell, the hopper knife, the handle release, the coin lockout, the coin deflector (hopper vs. coin drop) and four individually controlled coin lights.

Figure 14:
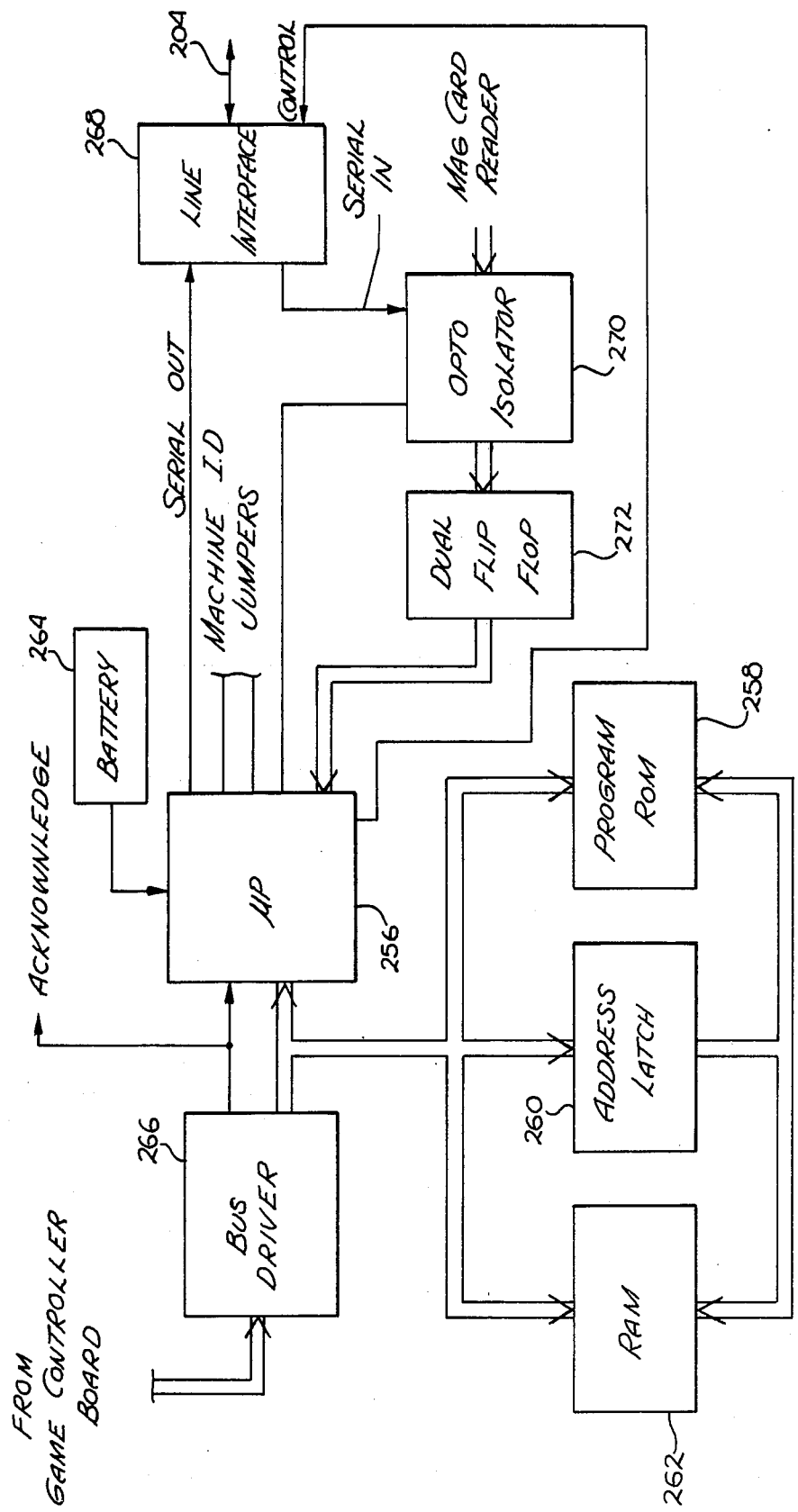
FIG. 14 is a block diagram of the data comm board.

Now referring to FIG. 14, a block diagram of the data communication board may be seen. As previously mentioned, each slot machine of the exemplary embodiment of the present invention contains both a controller board of FIG. 13 and a data comm board of FIG. 14. The data comm board also uses an 8035 microprocessor 256 communicating through the data bus to a program read only memory 258 using an address latch 260 so that both addresses and data (instructions) can be communicated over the same bus. In addition, to provide greater data storage capability than is in the microprocessor, additional random access memory 262 is provided on this bus, with a battery support 264 maintaining the random access memory during any power down situations so the accumulated data will not be lost in such event. The data bus is also coupled to the game controller board of FIG. 13 a buss buffer circuit. 266. This device is an Intel 8212 eight-bit input/output port which, under microprocessor control, creates an interrupt signal for the microprocessor and the acknowledge signal to the game controller. The first line of the first port of the microprocessor provides a serial output for the line interface 268, with the remaining seven lines of that port coming out for machine identification jumpers so that each data comm board may be given a unique address in an overall system. In particular, each of the first three of these seven lines may be jumpered to any of the remaining four of these lines, providing twelve separate possible jumper combinations. Thus, by use of these jumpers, up to 4,096 unique data comm addresses may be used. The advantage of 4,096 possible addresses when no more than 256 machines may be coupled to any specific node is that large casinos generally have more than 256, but less than 4,096 slot machines, so that each slot machine in a casino may have a unique address independent of which node of a plurality of nodes it is coupled to, thereby allowing the movement of machines between nodes without losing the unique identity thereof. As shall subsequently be seen, one of the initializing functions of each node is to sequentially go through all 4,096 addresses to identify which machines are coupled to that node by the response therefrom, so that only machines actually coupled to that node need be subsequently polled using a table created in the initial polling.

The line interface 268 couples the serial output line to serial line 204 coupling the remaining machines and the node (see FIG. 11). The line interface 268, being controlled by one of the lines from the second port of the microprocessor, also provides the serial input information received from line 204 to an opoisolator 270 which couples that signal to the T1 input of the microprocessor. Also the preferred embodiment of the present invention utilizes a mag card reader, also coupled through the optoisolator, and a dual flip flop 272 to the microprocessor for special communication purposes at the slot machine.

Figure 15:
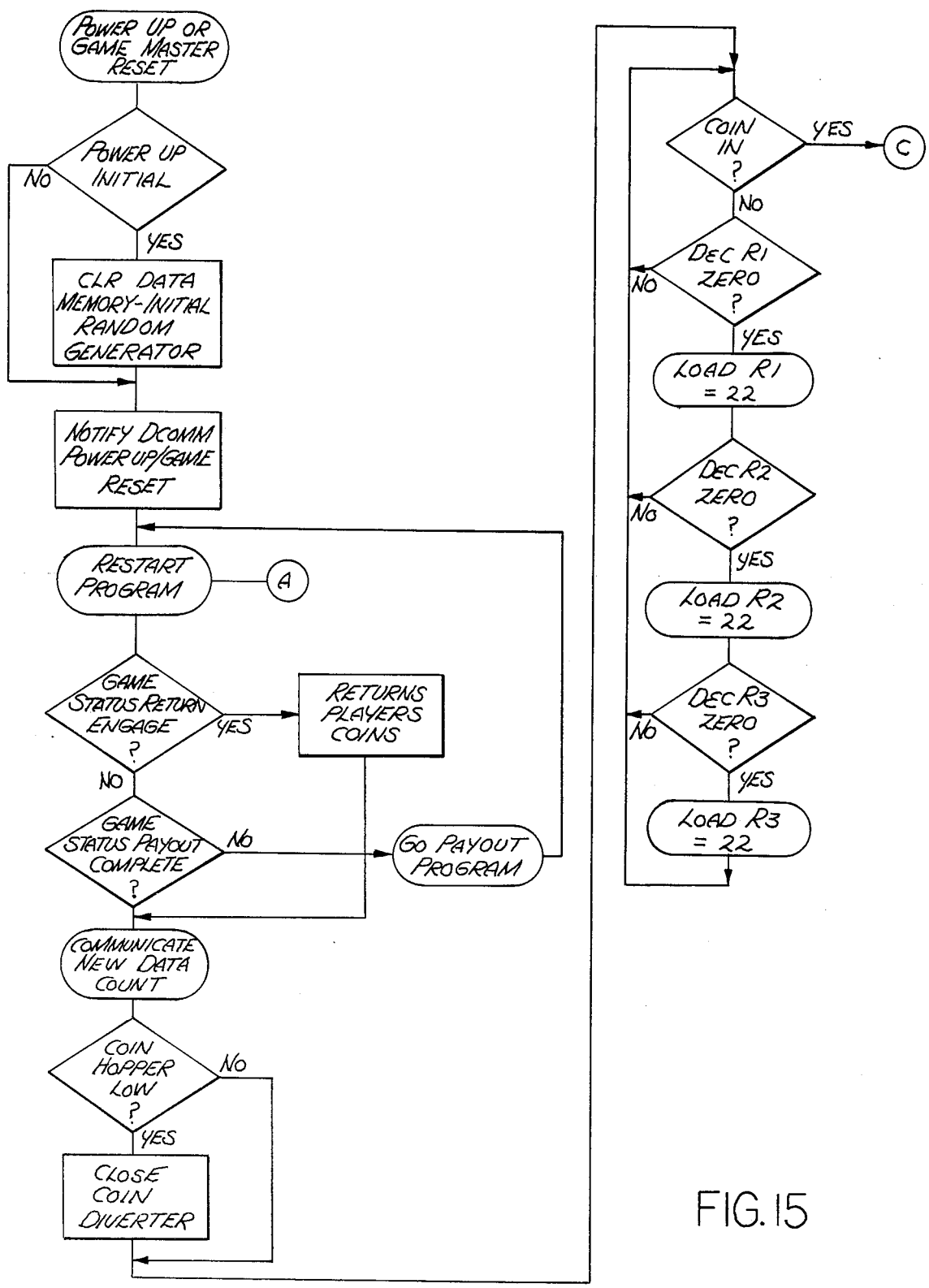
FIGS. 15 and 16 are logic flow diagrams for the gaming machine controller.
Figure 16:
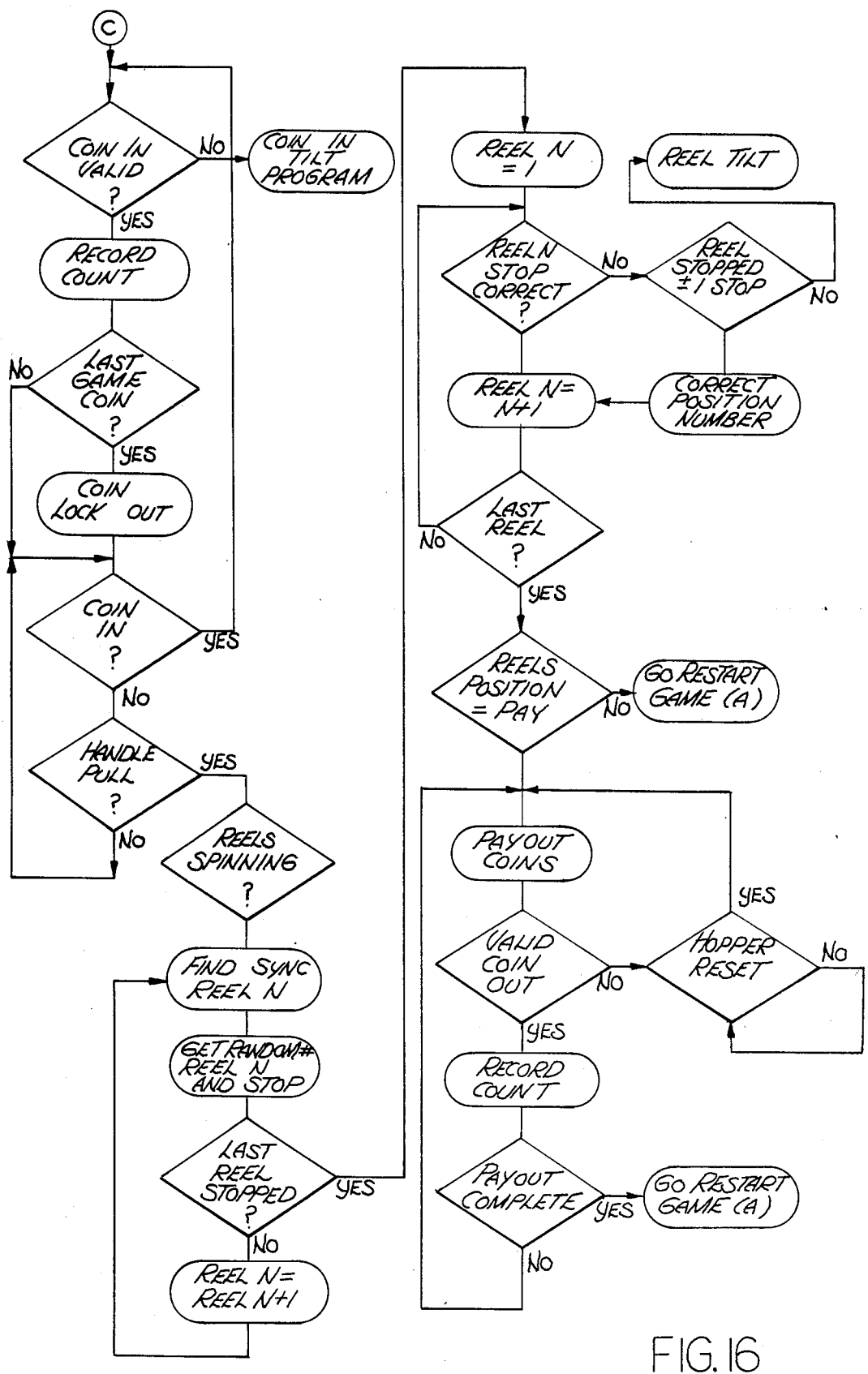

Now referring to FIGS. 15 and 16, logic flow diagrams for the slot machine controller may be seen. In FIG. 15, on power up or master reset, the controller first identifies which occurred. If a power up initialize is required, the data memory is cleared and the random generator initialized. In the case of a master reset, such as in clearing a tilt situation, this clearing and initializing is skipped, with the system immediately notifying the data comm of the power up or game reset condition. Thereafter, the system restarts the game program, which in effect is also the program re-enter point from a completed game, either as a result of a "no pay combination" or, in the case of a winning game, after the end of the payout routine. At this point the game status is checked to determine whether the players wager should be returned thereto, as a result of any interrupt which may have occurred during a game. If there has been such an interrupt, thereby interfereing with the completion of the game, the player's coins are returned and the system then communicates the new game data to the data comm board (the specific information being communicated will be subsequently described). If the wager is not to be returned, the game status is then checked to determine whether the payout is complete, either as a result of the execution of a payout routine on the existence of a winning condition or directly as a result of a no win condition. In either event, if no payout is to be made, or a payout is complete, again the new data count is communicated to the data comm as previously mentioned. Thereafter, the system determines whether the coin hopper is low, and if it is the coin diverter is closed so that additional coins entered into the machine will be diverted to the hopper until the hopper is "refilled". In that regard, since the system monitors all coins being entered into the machine and all coins being paid out from the hopper, the hopper level is automatically maintained by the system merely by counting coins as they are paid out, and keeping the coin diverter closed as new coins are entered until such time as the number of coins paid out have been returned to the hopper. Thereafter, of course, additional coins are allowed to drop (i.e. by-pass the hopper). Thus, whatever initial level of coins is provided in the hopper will be maintained during play, except as it may be temporarily diminished as a result of payouts by the machine. After making this determination, the system looks for a coin in indication. If there is no coin in signal, register $R_1$ is decremented (see FIG. 4) and tested for zero. If $R_1$ is not zero the system returns to the "coin-in" test, repetitively looping through the coin in and the decrementing of $R_1$ until a coin in indication is received or, more likely, register $R_1$ goes to zero. In this case, register $R_1$ is loaded with 22 (for a 22 position reel) and register $R_2$ is decremented and tested for zero. Assuming for the moment that a coin in signal is not received, it may be seen that register $R_1$ effectively counts down from 22, being reloaded with 22 each time zero is reached, on which occasion register $R_2$ is decremented and tested for zero, with each time register $R_2$ reaches zero that register being reloaded with 22 and register $R_3$ decremented and tested for zero. Thus, the loops resulting from negative coin in tests result in the constant counting of registers $R_1$, $R_2$ and $R_3$, through all possible combinations for a three reel 22 position slot machine (obviously, if a four or five reel machine is being used the count may be further extended by additional loops, provided the count frequency is sufficiently high to provide good randomness in comparison to the time between plays.)

On receipt of a coin in indication from the coin acceptor, the system exits to the coin in program shown in FIG. 16, thereby freezing the count in registers $R_1$, $R_2$ and $R_3$ in a random manner because of the random time of receipt of the coin. If the coin in is tested as not being valid, i.e. it does not satisfy specific requirements as set by the sensors in the coin acceptor, a coin tilt routine locks the machine up so that it cannot be played, and also communicates the problem to the data comm board. If the coin is valid the coin count is recorded and the number of coins that have been inserted is compared to the maximum number of coins allowable to determine whether or not the coin lockout should be activated. This and the following sequences are for machines which may be played with one or a plurality of coins up to some maximum such as five coins. Thus, on entry of the first coin the test for the last coin will be negative so that the system again looks for a coin in indication. If another coin has been entered it returns to the start to determine if the coin in is valid, whereas of a coin has not been entered it has to determine whether play has been initiated, by way of a handle pull, on the entry of less than the maximum number of coins which may be entered. If there is no handle pull indication the system continues in the loop looking for another coin in or a handle pull. Thus, it may be seen that before a coin is entered registers $R_1$, $R_2$ and $R_3$ are constantly cycling at a very high rate, which registers are stopped at a random position upon entry of the first coin, with the system thereafter looking for additional coins up to a maximum allowable number and/or a handle pull to initiate the game.

On the occurance of a handle pull the mechanical reel kicker mechanism, which may be substantially identical to that used in prior-art-mechanical and electromechanical slot machines, is actuated, thereby spinning the reels in the normal manner. The system then finds a sync for the first reel as herein before described, gets the random number from register $R_1$, and after a predetermined delay time stops the reel in accordance with the random number. Recognizing the first reel is not the last reel to be stopped, the system returns to find the for the next reel with the random number associated therewith, etc., until the last reel has been stopped.

After the last reel is stopped the system sequentially checks each reel to make sure that it stopped in the position corresponding to the associated random number. If any reel did not stop properly that reel is tested to determine whether it stopped within one posiion of the random position selected by the random number generator. If it did, the random number corresponding to position is corrected and the routine goes on. If, on the other hand, the reel did not stop at the proper position or within one position therefrom a reel tilt indication is given, communicating that fact to the data comm board and locking the system up until a master reset command is given.

Assuming all reels stoppped in the position corresponding to the associating random number or within one position thereof so as to be correctable, the system compares the reel positions to a lookup table to determine whether a win condition exists. In the preferred-embodiment slot machine this lookup table will be contained in ROM, since service to ROM can be replaced as desired to vary the payout conditions. If no payout is to be made the system returns to the restart position (A of FIG. 15) If, on the other hand, a payout is to be made, payout is initiated, with a detector on the payout system detecting the passage of coins thereby. If the coin out indicator does not indicate that coins are being dispensed as commanded, the routine determines whether the hopper is jammed or empty and if it is communicates that fact to the data comm board. If, on the other hand, no irregularity is detected in the hopper the hopper motor is left on so that the coins should be paid out, with each coin out being recorded until the payout is complete, at which time the routine then returns to the program restart position (A of FIG. 15). This then completes the operational system in the slot machine for a given game, with the routine quickly advancing to the loops generating the random numbers until a further coin-in is detected.

Figure 17:
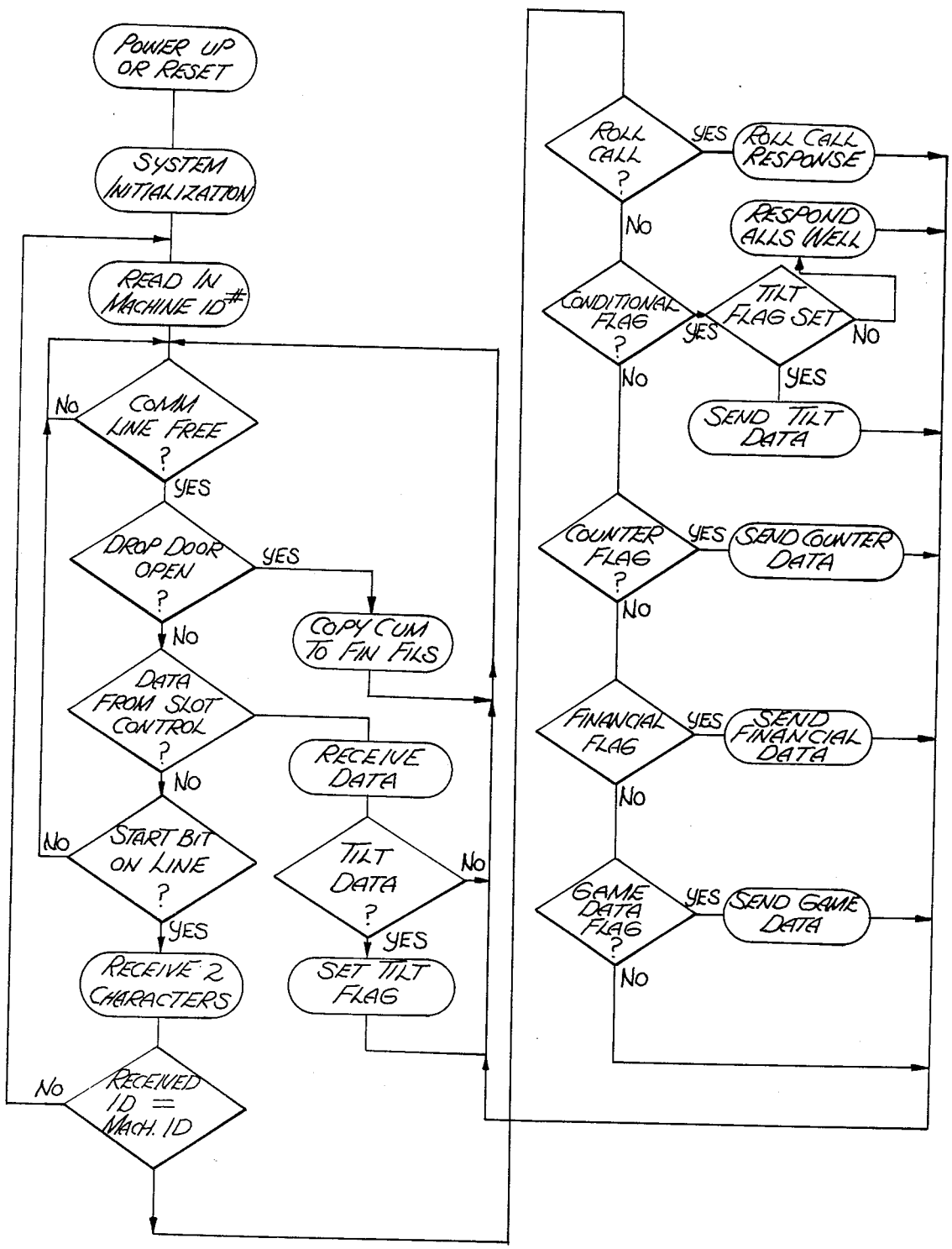
FIG. 17 is a logic flow diagram for the data comm board.

The logic flow diagram for the data comm board is shown in FIG. 17. On power up or reset the system is initialized in a conventional manner for micro processor systems. Thereafter, the machine identification number is read in and then the communication line is continually tested until it is free. At that point the routine checks the drop door switch to determine whether it is open. If it is, a flag is set and the data comm copies the cumlative files maintained in the data comm to the financial files in the data comm. Thereafter, the system returns to again test for an open communication line, preceeding past the drop door test because of the second pass through the routine to test for data from the slot machine. If there is data it is tested to determine whether it is tilt data, setting the tilt flag on a tilt before returning to test for the comm line free condition. If there is no data from the slot machine the routine tests to determine whether the start bit of a transmission over the comm line is present, and if it is receives, and retains the 16 bits in the following message. The first 12 of the 16 bits represent the identification number for each unique machine in the system. If the received identification number does not agree with the strapped in number the routine returns to again read in the strapped in number in case there is an error in that number. If the numbers do match the remaining 4 bits of the transmission are interrogated to determine which response is requested, such as merely a roll call response, a game condition response, a counter data response, financial data response or a response identifying the data of the last game played. In the preferred-embodiment a typical response to a machine condition request indicating that all is well is also a 2 byte response, the first 12 bits of the 2 bytes repeating the machine identification number, with the remaining 4 bits being all 0's to indicate all is well.

Having now described the detailed organization of the node, the individual slot machine controllers and the individual data communication boards, it may be seen that the node serves a number of functions. When coupled to the host computer as shown in FIG. 11 the node may receive commands from the computer and respond by sending the requested data to the host. The node may also receive commands from the input device (key board) responding by outputting the requested data to the output device (Printer or CRT or both). In some instances there is an intermediate step, in that data must be obtained from the slot machine data comm board and processed before the output function can occur. When not serviceing the host computer or input device the node polls the slot machines and receives data therefrom concerning their operational status and concerning their financial status. The operational data concerns information pertaining to the ability of the slot machine to operate properly, while the financial data contains information pertaining to the amount of money put into the slot machine and the amount of money paid out. In the preferred-embodiment the node contains conventional error detection soft-ware and hardware, and outputs messages when communication errors are detected and corrected.

The event which causes a node to request financial data from the slot machines (i.e. the data comm in each slot machine) may be a keyboard input, a command from the host computer, a predetermined time as determined by a clock, or whichever occurs first, as may be determined by the casino personnel. Typically a node might have two input devices and two output devices, on of each of which would be located on the casino floor for the use of maintainance personnel and one of each of which would be located in the manager's office. Data to and from these devices can be identical, or if desired, items of high security value or sensitivity may be restricted to the managers devices only. Obviously the node will operate with either or both I/O locations.

Figure 18:
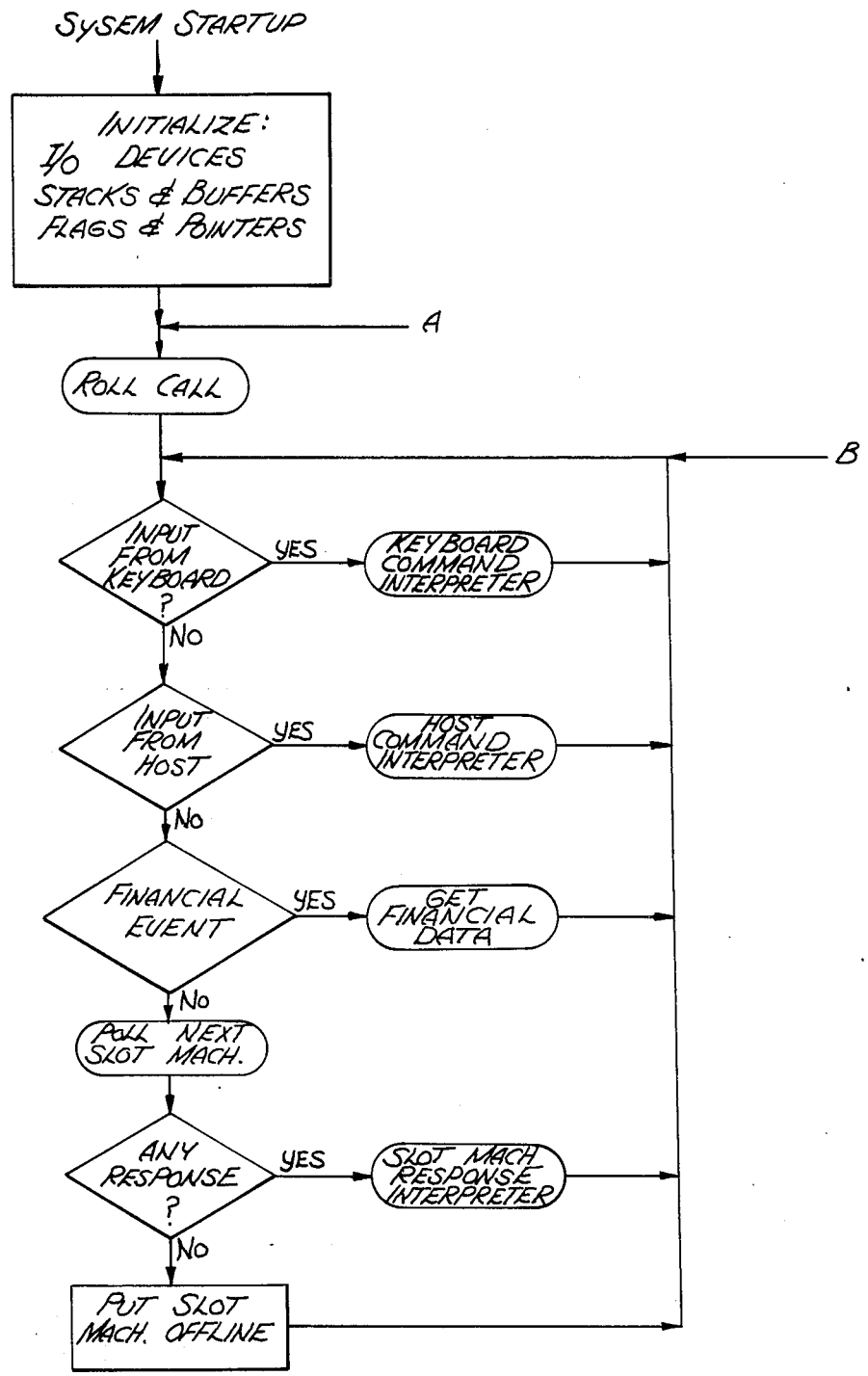
FIG. 18 is a logic flow diagram for a typical node.

A logic flow diagram of the node may be seen in FIG. 18. As with any system the node is initialized on start-up in the normal manner. Thereafter, the node goes to a roll call routine and finally cycles through a loop which includes testing for an input from the key board, and input from the host computer or a financial event, which if detected will result in the branching to the Keyboard Commanding Interpreter, the Host Command Interpreter or the Get Financial Data Routine, respectively, returning thereafter to again test for an input from the keyboard. If none of these three events occur the next slot machine is polled, based upon the response to the roll call, with the response from the slot machine being handled by the Slot Machine Interpreter. In the event a machine does not respond that machine is put off line with some indication of this occurance being provided to the output devices at the node to alert the appropriate personnel. It should be noted that putting a slot machine off line in this manner does not shut down the machine, as a node is purposely not given this capability, and in fact the machine may still be operating properly, as the failure may likely be between the slot machine controller and the node, not effecting operation of the machine itself. This is an important aspect of the present invention as each slot machine in the system is in effect a monitored free standing machine as opposed to a controlled machine, so that the cash accounting and surveilance system does not introduce additional failure modes thereto.

The various routines associated with the logic flow diagram of FIG. 18 have heretofore only been very briefly mentioned. Accordingly details of each of these routines are given here below.

ROUTINE ROLL CALL

This Routine Polls all slot machine numbers from 0 to 4095 inclusive. If a slot machine answers properly, then the routine puts the slot machine number in SMFILE and sets the corresponding status to "on line". (SMFILE is a file which contains the slot machine number and the current communication status of the slot machine associated with that number.) If a slot machine fails to answer or communicates three times with data or communication errors, then the routine will poll the next slot machine. When all slot machines have been polled, the node will output a report of the results of the roll call.

| Routine KEYBOARD COMMAND INTERPRETER | |
|---|---|
| If keyboard command is | then go to routine |
| ESCAPE | MENU |
| A | ALL |
| G | GAME |
| C | CUM |
| F | FIN |
| R | A (FIG. 18) |
| N | B (FIG. 18) |
| D | DATE |
| T | TIME |
| S | SCROLL |
| $ | REVENU |

If the keyboard command is none of the above, then output the message "Incorrect Command" to the output device(s) and go to routine MENU.

Routine MENU

Output a list of the valid keyboard commands as shown in routine KEYBOARD COMMAND INTERPRETER. Beside each command provide a brief description of the function associated with that command and then go to (B) of FIG. 18.

Routine GAME

Get a slot machine number from the input device. If the slot machine number is not in SMFILE then output the message "SM NOT ON SYSTEM" to the output device and go to (B). If the slot machine number is in SMFILE then poll that slot machine with a game poll. If the slot machine does not reply then output the message "SM NOT RESPONDING" to the output device and go to (B). If communication errors occurr or if the received data is incorrect, then output the appropriate message to the output device and go to (B). Otherwise convert the symbol data into words and output these words to the output device, then go to (B).

Routine ALL

The purpose of this routine is to provide a report which shows the current cumulative or financial status of all of the slot machines whose numbers are in SMFILE.

Input a character from the input device. If the character is not a C or F then output the message "Incorrect command, please re-enter" to the output device and go to routine MENU. Otherwise, put the corresponding poll code (cumulative or financial) in a register and continue. Output a header message which identifies the figures in the following columns (coins in, coins out, etc.).

Using the code previously saved in the register, poll each slot machine whose number is in SMFILE. If the slot machine does not respond or responds with to many communications or data errors, poll the next slot machine whose number is in SMFILE. If the slot machine responds properly then convert the data to ASCII and output this data to the output device. Continue until all slot machine numbers in SMFILE have been polled, and then go to (B).

Routine CUM

Get a slot machine number from the input device. If the slot machine number is not in SMFILE then output the message "SM NOT ON SYSTEM" to the output device and go to (B). If the slot machine number is in SMFILE then poll that slot machine with a cumulative roll. If the slot machine does not reply then output the message "SM NOT RESPONDING" to the output device and go to (B). If communications errors occur or if the received data is non-numeric then output the appropriate message to the output device and go to (B). Otherwise, output the data received from the slot machine to the output device.

Routine FIN

FIN operates identically to CUM except a financial poll is used rather than a cumulative poll, and the data displayed is the cumulative data in effect the last time the drop (cash box) door was opened.

Routine DATE

Get the current date, in binary format, from the real time clock. Convert the data from binary to ASCII, adding the appropriate header message, and output this to the output device. Then go to (B).

Routine TIME

Get the current time, in binary format, from the real time clock. Convert this data from binary to ASCII. Add the time message header to the time data and output this message to the output device. Then go to (B).

Routine SCROLL

The purpose of this routine is to display for the input device operator, a chronological list of all "exception reports" from all slot machines. Exception reports are responses from the slot machine which report occurrences which are not the normal operating procedure of the machine. These are stored as they occur in non-volatile memory (XFILE). SCROLL retrieves these data, starting with the most recent entry, does the necessary conversions, and outputs them to the output device. If the operator depresses the ESC key the routine is exited and operation continues at (B). Otherwise, reports are displayed until all reports stored have been displayed. Then operation continues at (B).

Routine REVENU

The purpose of this routine is to display for the input device operator the dollar values of all monies put into all slot machines, output from all slot machines and the amount of profit per machine. In addition, totals of all these items are outputted.

Get the report start date from the input device. If the input date is incorrect then output the message "Incorrect Date" and go to (B). If the requested date is before the oldest date for which data exists then output the message "Report Starting at" and the oldest date. Get the current financial data from all slot machines currently on line. This is accomplished in the following manner.

Each slot machine in SMFILE is polled with a financial poll. If the slot machine does not respond or if too many communication or data errors occur, then the next slot machine is polled. If the response is correct it is stored. This continues until all slot machines numbers in SMFILE have been polled.

Data are retrieved from FINFIL (financial file), JPFILE (hand paid jackpot file) and FILFIL (fill file) for each machine in SMFILE. Differences in coin counts are calculated by subtracting the coin counts of the requested date from the coin counts of todays data. These are converted into dollar amounts, using the denomination of the slot machine involved, and output to the output device. The amount of times the handle was pulled during the selected time period is calculated converted to ASCII, and outputted. The amount of jackpots and fills which occurred during the requested time period are converted from coin counts to dollar amounts and output to the output device. The net amount, the dollar percentage and the machine percentage are calculated and output. As coin in, coin out, coin drop, handle pulls, handpaid jackpot amounts, fill amounts and net amounts are calculated they are added to a set of total registers so that totals for these catagories may be printed at the end of the report. After reports have been output for all slot machines then the totals are output. Return to (B).

Host Command Interpreter

The host can issue two data requests to the node. These requests are transfer financial file and transfer exception code file. When these requests are received the node sends the entire contents of the requested file to the host. Communication and hand-shaking protocols between the host and the node are defined by the host equipment manufacturer.

The host may also issue a command to the node telling it to get financial data from the slot machines. See GET FINANCIAL DATA ROUTINE.

Get Financial Data

Upon the occurrence of some event the node proceeds to get the current financial data from all of the slot machines whose numbers are in SMFILE. The event which causes this reaction may be an input device command, a particular time on the real time clock or a command from the host.

Upon the occurrence of the event the node proceeds to poll each of the slot machines whose number is in SMFILE with a financial poll. If the slot machine does not respond or if there are too many data or communication errors, then the next slot machine is polled. If the slot machine data are correctly received they are reformated and put in the financial file (FINFIL) along with the current date and time. When all slot machines in SMFILE have been polled, control goes to (B).

Routine POLL NEXT SLOT MACHINE

The node keeps a pointer to tell where it is at in SMFILE. The slot machine whose number is currently pointed to will be polled with a conditional poll. The pointer will then be adjusted to point to the next entry in SMFILE. If this adjustment brings the pointer to the end of SMFILE it is reset to point to the beginning of SMFILE, i.e. SMFILE is a circular file.

When a slot machine receives a conditional poll it may respond with one of four acceptable responses. These are detailed in the routine SLOT MACHINE RESPONSE INTERPRETER.

Routine SLOT MACHINE RESPONSE INTERPRETER

When a slot machine receives a conditional poll it may properly respond with an all's well, a surveillance report, a handpaid jackpot report or a hopper fill report. These responses are described in detail below. If a slot machine responds improperly, then that fact is recorded in SMFILE for the machine just polled and an appropriate message is output to the output device.

Response—All's Well

This response indicates to the node that the slot machine is functioning properly. If the slot machine had previous communications problems the slot machine status in SMFILE is updated to show correct communication and an appropriate message is sent to the output device.

Response—Surveillance Report

The surveillance report may contain any one of the following items:
1. Power Up/Game Reset
2. Coin String
3. Coin Jam
4. Reel Tilt
5. Hopper Jam
6. Hopper Empty
7. Door Open
8. Door Closed An appropriate message is sent to the output device The data is reformatted, time and date are added, and the whole is put in the exception code file (XFILE).

Response—Hand Paid Jackpot

This response indicates to the node that a customer has won a larger amount than the slot machine is capable of paying. The data sent to the node includes the amount of coins the customer would have won if the slot machine had paid him his winnings.

The message is reformatted, time and date are added, and the result is stored in the hand paid jackpot file (JFILE) and an appropriate message sent to the output device.

Response—Hopper Fill

This response indicates that monies have been put into the slot machines payout device. The response data includes the amounts of coins below the full level that were in the payout device when it was filled. An appropriate message is sent to the output device. The hopper level amount is put with the current time and date and entered into the hipper fill file (FILFIL).

As data are received from the slot machine they are checked for communication errors. If any occur the slot machine is requested to repeat the previous response. If data are not received correctly after several repeat requests that fact is put into the Status information maintained in SMFILE for that slot machine number and an appropriate message is sent to the output device. The pointer to SMFILE is adjusted to point to the next slot machine.

When the response has been received with no communications errors it is checked for proper data content.

The type of checking depends upon the response type. It includes, but is not limited to, checking for numeric data in coin count fields, checking that codes are within the boundaries set for such codes, etc. If a data error is detected the slot machine is asked to repeat the response. If data are not proper after several repeat requests, then that fact is entered in the status information in SMFILE and an appropriate message is sent to the output device. If the slot machine had previously sustained a data problem and has now sent proper data, then the slot machine status is adjusted and a message is sent to the output device.

The visible attributes of communications and data errors on the output device are a message when they occur and another message when they are corrected.

Node—Host Communications

Communications between the node and the host computer will be checked for errors using a similar method as that for node-slot machine communications. Because of the variety of computer communications and protocols, all of which are well known, the specific checks need not be detailed herein.

In the description of FIG. 14 the line interface 268 was described as a device controlled by the microprocessor 256 for directing a serial input signal on line 204 to the optoisolator 270 and for driving the line 204 with the serial output from the microprocessor, the line 204 being a RS-232 line coupling the node to all slot machines on that node. Such a configuration represents the present embodiment of the invention though alternate communication forms may also be used. By way of example, it is contemplated that future embodiments may communicate over the casino power lines so that no separate line between the slot machines and node is required. In such an instance, frequency shift modulation could be used with the center frequency $f_0$ being used in place of a start byte. In such a system different nodes could operate on different frequencies, with strapping on the line interfaces 268 on each data comm board determining which node that machine will communicate with.

Thus, it may be seen that there are certain occurrances which will cause a slot machine controller to communicate with the data comm board, which communications in the preferred embodiment are always in a fixed format. In particular, in the preferred embodiment each communication from the slot machine controller to the data comm board includes the cumulative counts in the machine for coin in, coin out, coin drop, hand pay jackpot and hopper load, each of which comprise three bytes of information. In addition, information on the last game, specifically the nunber of coins put in, the number of coins paid out and the reel position for the last game is communicated. Finally, the denomination, type of machine and an exception report is also communicated each time. (If desired, the data format may depend upon the occurrence giving rise to the data transmission, though it is believed that the fixed format has the advantage of simplicity.) The occurrances giving rise to the transmission of data from the slot machine controller to the data comm board are; (1) the completion of each game cycle as may be generally indicated by the coin insert light going on, and (2) the occurrence of an exception condition. Thus, it may be seen that all the required totals are maintained in memory both on the slot machine controller board and on the data comm board, both of which are battery supported in the event of a power outage. In that regard, it will be noted that the coin in, coin out, and coin drop numbers are cumulative numbers, and thus have relevance only with respect to the last reading thereof.

The foregoing communications between the slot machine controller and the data comm board comprise all of the communications therebetween, as the data comm board cannot itself initiate any slot machine to data comm communications.

The drop door open condition, being an exception condition, causes the slot machine controller to output all information identified hereinabove, including an exception code which indicates the nature of the exception. As described with respect to FIG. 17, when the data comm board detects the existence of the drop door open condition the data in the cumulative files on the data comm board is also written into the financial files in data comm memory. Thus, the cumulative files on the data comm board maintain running totals, whereas the financial files on the data comm board maintain the cumulative counts as they existed on the last drop door opening.

The communications between the node and the data comm board are all initiated by the node, either as part of the regular polling sequence or by a manual input requesting specific information. Two general forms of communication are used in the preferred embodiment, the first being referred to as an unconditional poll and the second being referred to as a conditional poll. In unconditional polling each slot machine is addressed in sequence with the twelve bit address, with the second four bits of the second byte being all zeros for convenience. This represents a request for the respective data comm boards to reply with a status signal indicating the state of the machine. By way of example, if there are no exception conditions, a data comm board, when addressed, will reply with a two byte response, with the first twelve bits repeating its address and the last four bits indicating either that all is well or indicating the nature of the exception condition which exists. On an unconditional poll the node also sends out a two byte signal, the first twelve bits being the address for the respective data comm board, and the last four bits (not being other than 0000) indicating the nature of the conditional poll. Such polls may request the machine to respond with any desired data, such as, by way of example, the cumulative counts, the financial counts, or the last game information.

Thus, it may be seen that the slot machine operates as a stand alone device, with data being maintained in the machine for read out at any time between drop door openings. Thus, if a drop is made once a day, the node need only poll for financial data once a day between drops. Actually, if for some reason the node fails to poll for financial data between drops, the totals received after the next drop will still be accurate, providing the capacity of the cumulative count has not been exceeded, though the intermediate condition at the time of the prior drop door opening will have been lost. Consequently, because of the essentially non-volatile storage on the data comm boards and in the node, no data will be lost when the node goes down, provided operation is restored at some point between drops, and no cumulative data is lost even if the node is down for somewhat longer times, depending upon the storage capacity on the data comm boards and of course the usage of the machine. In the preferred embodiment the bubble memory in the node provides a one week storage capacity, which means that the host computer (or other data integration means) may be down for up to one week without the loss of any information in the node.

There has been described herein a new and unique cash accounting and surveilence system for games which provides full accounting and surveilence with non-volitale storage both at the machine and at each node without contributing additional failure modes to the machines being monitored. Obviously while the system has been described with respect to certain preferred embodiments thereof it should be understood by those skilled in the art that various changes in form and detail may be made therein without departing from the spirit and scope of the invention.

We claim:

1. A cash accounting and surveillance system for gaming machines comprising;
   first means within each machine for monitoring the input of items of monetary value and the payout of items of monetary value, and for maintaining digital signals indicative of the cumulative numbers thereof,
   second means within each machine for communication over data lines, said second means having a unique address on said communication lines and being responsive thereto to transmit said signals of said first means on said data lines,
   node means coupled to a plurality of said second means through said data communication lines, said node means including means for polling all of said second means coupled thereto and for receiving said digital signals therefrom, said node means having non-volatile storage means for maintaining data responsive to said digital signals in spite of system power loss and node means failures.

2. The system of claim 1 wherein said first means includes means for maintaining said digital signals in spite of system power loss.

3. The system of claim 1 wherein said second means in each machine is a means for communicating over a serial communication line, and said node means is coupled to a plurality of said second means through said serial line.

4. The system of claim 1 wherein said node means includes roll call means for polling each possible unique address which might be used to identify which of the possible addresses have a gaming machine associated therewith as indicated by a response from said second means therein, whereby subsequent polling may be limited to a subset of possible addresses corresponding to gaming machines actually coupled to said node means by said communication lines.

5. The system of claim 4 wherein said node means can accomodate up to a first number of addresses in said subset of possible addresses, said number of possible addresses being a second number substantially exceeding said first number, whereby each machine in a casino may have and maintain a unique address even though a number of said nodes are used and the total number of machines in the casino exceed the number of machines that may be coupled to any one node as determined by said first number.

6. The system of claim 1 further comprised of means for sensing the opening of a drop door indicating removal of accumulated items of monetary value, said first means further being a means responsive to said drop door opening for maintaining additional digital signals indicative of said cumulative numbers at the last opening of said drop door.

7. The system of claim 1 further comprised of exception code generating means for sensing certain machine malfunctions and types of cheating and providing exception code digital signals responsive thereto to said second means for communication to said node means upon polling of the respective machine.

8. The system of claim 7 wherein said node means includes means for polling each of said machines for selective transmission of said digital signals indicative of the input and output of items of monetary value or said exception code digital signals.

9. The system of claim 1 further comprised of means in said node means for communicating with a host computer.

10. The system of claim 1 wherein control of the gaming machine resides in said machine, so that machine operation cannot be effected and controlled by said node.

11. The system of claim 1 wherein said communication lines comprise the power lines for said gaming machines.

12. A cash accounting and surveillance system for slot machines comprising:
    electronic control means within each slot machine for controlling the input of coins and the payout of coins;
    storage means within each slot machine for maintaining digital signals indicative of the cumulative numbers of coins put into and coins paid out by that machine;
    communication means within each machine for communication over data lines, said communication means having a unique address on said communication line and being responsive thereto to transmit said digitals signals on said data lines;
    node means coupled to a plurality of said communication means through said data communication line, said node means including means for polling all of said communication means coupled thereto and for receiving said digital signals therefrom, said node means having non-volatile storage means for maintaining data responsive to said digital signals in spite of system power loss and node means failures.

13. The system of claim 12 wherein said storage means includes means for maintaining said digital signals in spite of system power loss.

14. The system of claim 12 wherein said communication means in each machine is a means for communicating over a serial communication line, and said node means is coupled to a plurality of said communication means through said serial line.

15. The system of claim 12 wherein said node means includes roll call means for polling each possible unique address which might be used to identify which of the possible addresses have a slot machine associated therewith as indicated by a response from said communication means therein, whereby subsequent polling may be limited to a subset of possible addresses corresponding to slot machines actually coupled to said node means by said communication lines.

16. The system of claim 15 wherein said node means can accomodate up to a first number of addresses in said subset of possible addresses, said number of possible addresses being a second number substantially exceeding said first number, whereby each machine in a casino may have and maintain a unique address even though a number of said nodes are used and the total number of machines in the casino exceed the number of machines that may be coupled to any one node, as determined by said first number.

17. The system of claim 12 further comprised of means for sensing the opening of a drop door indicating removal of accumulated coins, said storage means further being a means responsive to said drop door opening for maintaining additional digital signals indicative of said cumulative numbers at the last opening of said drop door.

18. The system of claim 12 further comprised of exception code generating means for sensing certain machine malfunctions and types of cheating and providing exception code digital signals responsive thereto to said communication means for communication to said node means upon polling of the respective machine.

19. The system of claim 18 wherein said node means includes means for polling each of said machines for selective transmission of said digital signals indicative of the input and output of coins or said exception code digital signals.

20. The system of claim 12 further comprised of means in said node means for communicating with a host computer.

21. The system of claim 12 wherein control of the slot machine resides in said electronic control means, so that machine operation cannot be effected and controlled by said node.

22. The system of claim 12 wherein said communication line comprises the power lines for said slot machines.

23. The system of claim 12 wherein each slot machine has a plurality of reels, each spinnable by mechanical reel spinning means.

24. The system of claim 23 wherein said electronic control means controls the random position at which said reels of said slot machine will be stopped.

* * * * *